United States Patent
Wu et al.

(10) Patent No.: US 12,114,124 B2
(45) Date of Patent: Oct. 8, 2024

(54) HEADSET

(71) Applicant: HUAWEI TECHNOLOGIES CO., LTD., Guangdong (CN)

(72) Inventors: Rongrong Wu, Shanghai (CN); Yong Zheng, Dongguan (CN); Guozhen Ma, Shenzhen (CN); Naotaka Tsunoda, Tokyo (JP); Xiansheng Li, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 207 days.

(21) Appl. No.: 17/706,487

(22) Filed: Mar. 28, 2022

(65) Prior Publication Data

US 2022/0225015 A1   Jul. 14, 2022

Related U.S. Application Data

(63) Continuation of application No. PCT/CN2020/117680, filed on Sep. 25, 2020.

(30) Foreign Application Priority Data

Sep. 27, 2019   (CN) .......................... 201910939699.0

(51) Int. Cl.
*H04R 1/10*   (2006.01)
*H04R 1/28*   (2006.01)
(Continued)

(52) U.S. Cl.
CPC ......... *H04R 1/1083* (2013.01); *H04R 1/1008* (2013.01); *H04R 1/1033* (2013.01); *H04R 1/105* (2013.01); *H04R 1/1075* (2013.01); *H04R 1/1016* (2013.01); *H04R 1/2826* (2013.01); *H04R 1/347* (2013.01); *H04R 5/033* (2013.01);
(Continued)

(58) Field of Classification Search
CPC .. H04R 1/1083; H04R 1/1008; H04R 1/1033; H04R 1/105; H04R 1/1075; H04R 1/1016; H04R 1/347; H04R 1/2829; H04R 1/2826; H04R 2205/022; H04R 5/033; H04R 25/60; H04R 1/1041; H04R 1/107
See application file for complete search history.

(56) References Cited

U.S. PATENT DOCUMENTS 6,831,984 B2   12/2004   Sapiejewski
2002/0080990 A1   6/2002   Lin
(Continued)

FOREIGN PATENT DOCUMENTS

CN   204795520 U   11/2015
CN   105208486 A   12/2015
(Continued)

*Primary Examiner* — Carolyn R Edwards
*Assistant Examiner* — Kuassi A Ganmavo
(74) *Attorney, Agent, or Firm* — James Harrison

(57) ABSTRACT

Embodiments of this application disclose a noise reduction headset. A branch pipe is disposed in the headset to connect a sound cavity inside the headset and an external environment. The branch pipe has a low-pass filter function to filter out high-band noise entering the sound cavity from the external environment, so that impact on sound quality inside the sound cavity that is caused by noise in the external environment is reduced, thereby implementing passive noise reduction.

22 Claims, 28 Drawing Sheets

(51) Int. Cl.
*H04R 1/34* (2006.01)
*H04R 5/033* (2006.01)
*H04R 25/00* (2006.01)

(52) U.S. Cl.
CPC ........ *H04R 25/60* (2013.01); *H04R 2205/022* (2013.01)

(56) References Cited

U.S. PATENT DOCUMENTS

| | | | |
|---|---|---|---|
| 2009/0180657 A1* | 7/2009 | Isvan | H04R 1/2849 381/371 |
| 2009/0190771 A1* | 7/2009 | Sung | A61F 11/08 381/71.6 |
| 2013/0343594 A1 | 12/2013 | Howes et al. | |
| 2014/0363040 A1* | 12/2014 | Silvestri | H04R 1/2888 381/380 |
| 2015/0172800 A1* | 6/2015 | Azmi | H04R 1/1016 381/380 |
| 2017/0195776 A1* | 7/2017 | Reimert | H04R 1/22 |
| 2017/0223443 A1 | 8/2017 | Silvestri et al. | |
| 2018/0352318 A1* | 12/2018 | Yoneyama | H04R 1/288 |
| 2020/0104908 A1* | 4/2020 | Shahabi | G06Q 30/0641 |
| 2020/0154193 A1* | 5/2020 | Hanes | H04R 3/007 |
| 2021/0337294 A1* | 10/2021 | Dory | H04R 1/1008 |

FOREIGN PATENT DOCUMENTS

| | | | | |
|---|---|---|---|---|
| CN | 204948303 U | | 1/2016 | |
| CN | 105589506 A | | 5/2016 | |
| CN | 205378184 U | | 7/2016 | |
| CN | 105992092 A | | 10/2016 | |
| CN | 106105257 A | | 11/2016 | |
| CN | 206728236 U | | 12/2017 | |
| CN | 107948803 A | | 4/2018 | |
| CN | 108429959 A | | 8/2018 | |
| CN | 108429960 A | | 8/2018 | |
| CN | 108605178 A | | 9/2018 | |
| CN | 108810703 A | | 11/2018 | |
| CN | 109068228 A | | 12/2018 | |
| CN | 110100454 A | | 8/2019 | |
| JP | 638284 A | * | 2/1994 | |
| JP | H11150779 A | * | 6/1999 | |
| JP | 2003507952 A | | 2/2003 | |
| JP | 2005501496 A | | 1/2005 | |
| JP | 2005191663 A | | 7/2005 | |
| JP | 2005269633 A | | 9/2005 | |
| JP | 2011087048 A | | 4/2011 | |
| JP | 2016158227 A | | 9/2016 | |
| JP | 2019507547 A | | 3/2019 | |
| JP | 3222536 U | | 8/2019 | |
| JP | 2022026448 A | | 2/2022 | |
| WO | WO-03010993 A2 | * | 2/2003 | ........... G10K 11/178 |
| WO | 2012114644 A1 | | 8/2012 | |
| WO | 2019151988 A1 | | 8/2019 | |

* cited by examiner

HEADSET

CROSS-REFERENCE TO RELATED APPLICATIONS

This application is a continuation of International Application No. PCT/CN2020/117680, filed on Sep. 25, 2020, which claims priority to Chinese Patent Application No. 201910939699.0, filed on Sep. 27, 2019. The disclosures of the aforementioned applications are hereby incorporated by reference in their entireties.

TECHNICAL FIELD

This application relates to the field of consumer electronic product technologies, and in particular, to an electronic device for processing audio.

BACKGROUND

When a headset is being used, noise can seriously interfere with a sound signal inside the headset if noise in a surrounding environment is quite loud. Therefore, it is generally desired for the noise in the surrounding environment to be well isolated, so that a user is not affected when listening to an audio signal by using the headset.

A sound cavity is disposed inside the headset, and a driver is disposed inside the sound cavity. A diaphragm of the driver is configured to generate a sound wave, and the sound wave is transmitted to an ear of the user by using the sound cavity. When noise in an external environment enters the sound cavity, the sound wave in the sound cavity is affected. How to reduce impact of the noise is an urgent problem that currently needs to be resolved.

SUMMARY

In view of this, embodiments of this disclosure provide a noise reduction headset, to reduce impact on sound quality of the headset that is caused by noise in an external environment.

According to a first aspect, this application provides a headset receiver. The headset receiver includes a housing and a driver located inside the housing, the driver is configured to: receive an audio signal, and convert the audio signal into a sound wave, a sound cavity is disposed inside the housing, the sound cavity includes a front cavity and a rear cavity that are disposed adjacent to each other, the driver is disposed at a junction between the front cavity and the rear cavity, the headset receiver further includes a branch pipe, and the branch pipe connects the front cavity, the rear cavity, and an external environment.

The branch pipe connects the front cavity, the rear cavity, and the external environment, to allow a low-band sound wave entering from the external environment to pass through and filter out a high-band sound wave entering from the external environment, so that noise entering the front cavity from the external environment is reduced, and a relatively good passive noise reduction (Passive noise reduction, PNR) effect is achieved.

Further, the branch pipe couples both the front cavity and the rear cavity to the external environment of the headset, so that atmospheric pressure in the front cavity and the rear cavity can be released, and atmospheric pressure in the front cavity, atmospheric pressure in the rear cavity, and atmospheric pressure in the external environment can be balanced. In this way, reliability of a diaphragm under impact of pressure pulsations of sound waves can be improved, and acoustic comfort of a human ear can be improved.

In a first possible implementation, the branch pipe is in a structural form of a three-way pipe, and the three-way pipe includes a hub pipe, a first pipe, a second pipe, and a third pipe. The first pipe, the second pipe, and the third pipe are all connected to the hub pipe, and the hub pipe is located in the rear cavity.

With reference to the first possible implementation of the first aspect, in a second possible implementation, an end that is of the first pipe and that is connected to the front cavity is a first open end, and one or more first openings are disposed in the first open end. An end that is of the third pipe and that is connected to the rear cavity is a third open end, and one or more third openings are disposed in the third open end. An end that is of the second pipe and that is connected to the external environment is a second open end, and one or more second openings are disposed in the second open end. The first open end extends toward the front cavity, and is connected to the front cavity by using the first opening, and the second open end extends toward the outside of a rear cavity housing, and is connected to the outside of the rear cavity housing by using the second opening. The rear cavity housing is configured to surround the rear cavity.

With reference to the first possible implementation of the first aspect, in a third possible implementation, the three-way pipe includes a hub pipe, a first pipe, and a second pipe, both the first pipe and the second pipe are connected to the hub pipe, and one or more third openings are disposed in the hub pipe. The hub pipe is located in the rear cavity.

With reference to the third possible implementation of the first aspect, in a fourth possible implementation, an end that is of the first pipe and that is connected to the front cavity is a first open end, and one or more first openings are disposed in the first open end. An end that is of the second pipe and that is connected to the external environment is a second open end, and one or more second openings are disposed in the second open end. The first open end extends toward the front cavity, and is connected to the front cavity by using the first opening, and the second open end extends toward the outside of a rear cavity housing, and is connected to the outside of the rear cavity housing by using the second opening. The rear cavity housing is configured to surround the rear cavity.

With reference to the second, the third, or the fourth possible implementation of the first aspect, in a fifth possible implementation, a first through-hole is disposed in the driver, and the first through-hole connects the front cavity and the rear cavity. The first open end is connected to the front cavity by using the first through-hole. The first through-hole is disposed outside a diaphragm of the driver.

With reference to the second, the third, or the fourth possible implementation of the first aspect, in a sixth possible implementation, the headset receiver may further include a baffle, the driver is installed on the baffle, and the baffle and the driver are disposed at the junction between the front cavity and the rear cavity. One or more first through-holes may be disposed in the baffle, and the first through-holes connect the front cavity and the rear cavity. The first open end is connected to the front cavity by using the first through-hole.

With reference to any one of the second to the sixth possible implementations of the first aspect, in a seventh possible implementation, one or more second through-holes may be disposed in the rear cavity housing, and the second through-holes connect the rear cavity and the external environment. The second open end is connected to the external environment by using the second through-holes.

In an eighth possible implementation of the first aspect, the branch pipe includes a two-way pipe connecting the front cavity and the rear cavity and a two-way pipe connecting the rear cavity and the external environment.

In a ninth possible implementation of the first aspect, the sound cavity further includes an additional rear cavity, the branch pipe is further configured to connect to the additional rear cavity, the additional rear cavity surrounds the outside of the rear cavity, one side of the rear cavity is adjacent to the front cavity, and the other side is adjacent to the additional rear cavity.

With reference to the ninth possible implementation of the first aspect, in a tenth possible implementation, the branch pipe is in a structural form of a four-way pipe, and the four-way pipe includes a pipe A, a pipe B, a pipe C, a pipe D, and a hub pipe. The pipe A, the pipe B, the pipe C, and the pipe D are all connected to the hub pipe. The hub pipe may be located in the additional rear cavity, or the hub pipe may cross the rear cavity and the additional rear cavity.

With reference to the tenth possible implementation of the first aspect, in an eleventh possible implementation, an open end A of the pipe A extends toward the front cavity, and is connected to the front cavity, one or more openings A are disposed in the open end A, and the one or more openings A are connected to the front cavity. An open end B of the pipe B extends toward the rear cavity, and is connected to the rear cavity, one or more openings B are disposed in the open end B, and the one or more openings B are connected to the rear cavity. An open end C of the pipe C extends toward the additional rear cavity, and is connected to the additional rear cavity, one or more openings C are disposed in the open end C, and the one or more openings C are connected to the additional rear cavity. An open end D of the pipe D extends toward the outside of an additional rear cavity housing, and is connected to the external environment, one or more openings D are disposed in the open end D, and the one or more openings D are connected to the external environment. The additional rear cavity housing is configured to surround the additional rear cavity.

With reference to the eleventh possible implementation of the first aspect, in a twelfth possible implementation, an open end A of the first type of pipe A may be connected to the front cavity by using a first through-hole between the front cavity and the rear cavity. An open end A of the second type of pipe A is connected to the front cavity by using a through-hole of a spacer between the front cavity and the additional rear cavity. One or both of the first type of pipe A and the second type of pipe A are disposed in the four-way pipe. The front cavity and the additional rear cavity are isolated from each other by using the spacer.

With reference to the eleventh or the twelfth possible implementation of the first aspect, in a thirteenth possible implementation, an open end B of the first type of pipe B may be connected to the rear cavity by using a through-hole of a rear cavity housing. When the hub pipe extends into the rear cavity, the second type of pipe B is connected to a part that is of the hub pipe and that is located in the rear cavity, and the second type of pipe B does not need to pass through the through-hole of the rear cavity housing between the rear cavity and the additional rear cavity. In addition, the second type of pipe B may be further simplified as one or more openings B, and the one or more openings B are disposed in the part that is of the hub pipe and that is located in the rear cavity. One or both of the first type of pipe B and the second type of pipe B are disposed in the four-way pipe. The additional rear cavity and the rear cavity are isolated from each other by using the rear cavity housing.

With reference to the eleventh, the twelfth, or the thirteenth possible implementation of the first aspect, in a fourteenth possible implementation, an open end C of the first type of pipe C is connected to the additional rear cavity by using the through-hole of the rear cavity housing. When the hub pipe extends into the additional rear cavity, the second type of pipe C is connected to a part that is of the hub pipe and that is located in the additional rear cavity, and the second type of pipe C does not need to pass through the through-hole of the rear cavity housing between the rear cavity and the additional rear cavity. In addition, the second type of pipe C may be further simplified as one or more openings C, and the one or more openings C are disposed in the part that is of the hub pipe and that is located in the additional rear cavity. One or both of the first type of pipe C and the second type of pipe C are disposed in the four-way pipe.

With reference to the eleventh, the twelfth, the thirteenth, or the fourteenth possible implementation of the first aspect, in a fifteenth possible implementation, the open end D of the pipe D is connected to the external environment by using a through-hole of the additional rear cavity housing.

With reference to the ninth possible implementation of the first aspect, in a sixteenth possible implementation, the branch pipe includes a three-way pipe connecting the front cavity, the rear cavity, and the additional rear cavity and a two-way pipe connecting the additional rear cavity and the external environment. The three-way pipe includes a hub pipe, a first pipe, a second pipe, and a third pipe, the first pipe, the second pipe, and the third pipe are all connected to the hub pipe, and the hub pipe is located in the rear cavity or the additional rear cavity, or the hub pipe of the three-way pipe may cross the rear cavity and the additional rear cavity.

With reference to the ninth possible implementation of the first aspect, in a seventeenth possible implementation, the branch pipe includes a three-way pipe connecting the front cavity, the additional rear cavity, and the external environment and a two-way pipe connecting the rear cavity and the additional rear cavity. The three-way pipe includes a hub pipe, a first pipe, a second pipe, and a third pipe, the first pipe, the second pipe, and the third pipe are all connected to the hub pipe, and the hub pipe is located in the additional rear cavity.

With reference to the ninth possible implementation of the first aspect, in an eighteenth possible implementation, the branch pipe includes a three-way pipe connecting the rear cavity, the additional rear cavity, and the external environment and a two-way pipe connecting the front cavity and the rear cavity, the three-way pipe includes a hub pipe, a first pipe, a second pipe, and a third pipe, the first pipe, the second pipe, and the third pipe are all connected to the hub pipe, and the hub pipe is located in the additional rear cavity.

With reference to the ninth possible implementation of the first aspect, in a nineteenth possible implementation, the branch pipe includes a three-way pipe connecting the rear cavity, the additional rear cavity, and the external environment and a two-way pipe connecting the front cavity and the additional rear cavity, the three-way pipe includes a hub pipe, a first pipe, a second pipe, and a third pipe, the first pipe, the second pipe, and the third pipe are all connected to the hub pipe, and the hub pipe is located in the additional rear cavity.

With reference to the ninth possible implementation of the first aspect, in a twentieth possible implementation, the branch pipe includes a two-way pipe connecting the front cavity and the rear cavity, a two-way pipe connecting the rear cavity and the additional rear cavity, and a two-way pipe connecting the additional rear cavity and the external environment.

With reference to the ninth possible implementation of the first aspect, in a twenty-first possible implementation, the branch pipe includes a two-way pipe connecting the front cavity and the additional rear cavity, a two-way pipe connecting the rear cavity and the additional rear cavity, and a two-way pipe connecting the additional rear cavity and the external environment.

With reference to any one of the foregoing possible implementations, in a twenty-second possible implementation, a part that is of the branch pipe and that is located between the front cavity and the external environment is a low-pass filter pipe, and the low-pass filter pipe may be an elongated pipe.

With reference to the twenty-second possible implementation of the first aspect, in a twenty-third possible implementation, a ratio of a cross-sectional area to a length of a valid section of the low-pass filter pipe may be less than or equal to 4 mm$^2$/10 mm. The valid section is a pipe section that is in the low-pass filter pipe and that substantially affects filter performance.

With reference to the twenty-third possible implementation of the first aspect, in a twenty-fourth possible implementation, if a pipe that is in the branch pipe and that is used as the low-pass filter pipe is a three-way pipe or a four-way pipe, there may be one or more openings in each open end of the low-pass filter pipe, and the valid section of the low-pass filter pipe is a pipe section between closest openings between two ends of the low-pass filter pipe in an extension direction of the low-pass filter pipe.

With reference to the twenty-third possible implementation of the first aspect, in a twenty-fifth possible implementation, if the low-pass filter pipe includes m separated pipes, a valid section of each of the separated pipes is a pipe section between closest openings between two ends of the low-pass filter pipe in the pipe in an extension direction of the low-pass filter pipe in the pipe. It is assumed that a cross-sectional area of a valid section of the first pipe is P1, a length of the valid section of the first pipe is F1, a cross-sectional area of a valid section of the second pipe is P2, a length of the valid section of the second pipe is F2, . . . , a cross-sectional area of a valid section of the m$^{th}$ pipe is Pm, and a length of the valid section of the m$^{th}$ pipe is Fm. The length of the valid section of the low-pass filter pipe is F1+F2+ . . . +Fm, and the cross-sectional area of the valid section of the low-pass filter pipe is (P1×F1+P2×F2+ . . . +Pm×Fm)/(F1+F2+ . . . +Fm), where m is a positive integer greater than 1.

With reference to the twenty-third possible implementation of the first aspect, in a twenty-sixth possible implementation, if pipes in the branch pipe that are used as the low-pass filter pipe are separated, for the plurality of separated pipes, ratios of cross-sectional areas to lengths of valid sections of any one or more of the pipes may be less than or equal to 4 mm$^2$/10 mm, or ratios of cross-sectional areas to lengths of valid sections of all of the pipes may be less than or equal to 4 mm$^2$/10 mm.

With reference to any one of the foregoing possible implementations, in a twenty-seventh possible implementation, one or more microporous channels are disposed in the rear cavity housing.

When the additional rear cavity is not disposed, the microporous channel is disposed in the rear cavity housing, and connects the rear cavity and the external environment.

When the additional rear cavity is disposed, the microporous channel is disposed in the rear cavity housing, and connects the rear cavity and the additional rear cavity, and the rear cavity housing is configured to surround the rear cavity.

The microporous channel is disposed to provide acoustic damping. A low-band sound wave in sound waves emitted by the driver resonates with the rear cavity and the low-pass filter pipe. The microporous channel can suppress the resonance to some extent by providing acoustic damping. In this way, a low-band sound wave response is not prone to fluctuation. In this way, more flat sound pressure level magnitude and phase responses on a low band can be implemented by using the microporous channel.

With reference to the twenty-seventh possible implementation of the first aspect, in a twenty-eighth possible implementation, a length of the microporous channel is not less than 0.5 mm.

With reference to the twenty-seventh possible implementation of the first aspect, in a twenty-ninth possible implementation, a cross-sectional area of a single microporous channel ranges from 0.2 mm$^2$ to 5 mm$^2$.

With reference to the twenty-seventh possible implementation of the first aspect, in a thirtieth possible implementation, when there are a plurality of microporous channels, the plurality of microporous channels may be arranged together.

With reference to the twenty-seventh possible implementation of the first aspect, in a thirty-first possible implementation, when there are a plurality of microporous channels, a total cross-sectional area of the plurality of microporous channels ranges from 1 mm$^2$ to 20 mm$^2$.

According to a second aspect, this application further provides a headset, including a headband and headset receivers connected to two ends of the headband. The headset receiver is the headset receiver in any one of the implementations of the first aspect.

In a first implementation of the second aspect, the headset further includes a headset cable, and the headset cable is connected to a driver inside the headset receiver.

According to a third aspect, this application further provides a headset, including a headset cable and the headset receiver in any one of the implementations of the first aspect. The headset cable is connected to a driver inside the headset receiver.

Figure 1:
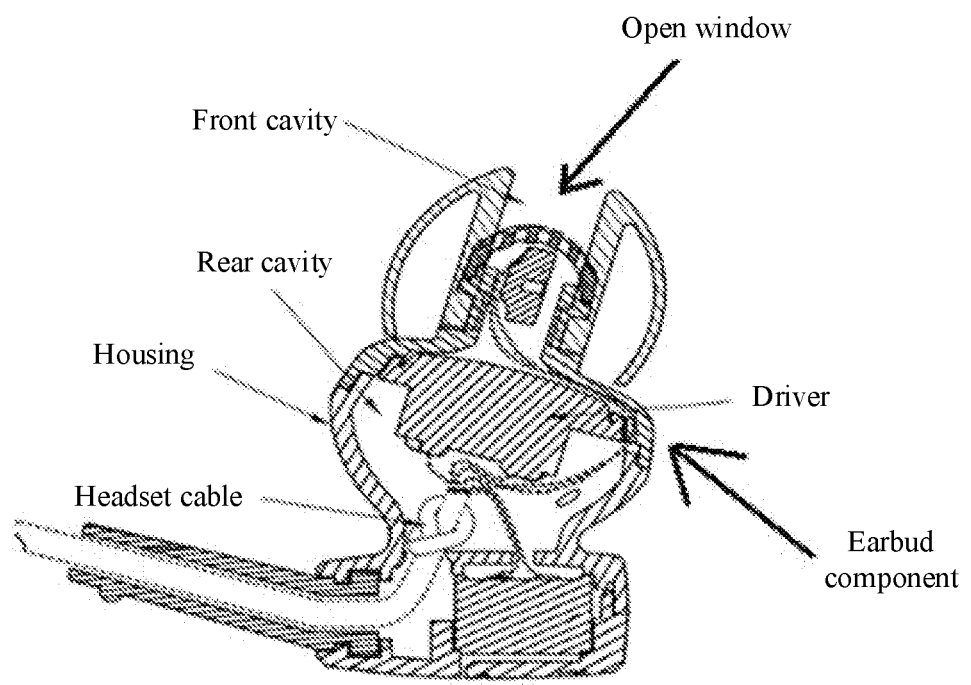
FIG. 1 is a sectional view of an in-ear earphone.

Element reference numerals in the accompanying drawings are specifically as follows:

Headband 1; headset cable 3; earmuff component 2; housing 21; driver 22; diaphragm 221; front cavity 23; front cavity housing 231; front end 232; open window 2321; rear cavity 24; rear cavity housing 241; baffle 25; additional rear cavity 26; additional rear cavity housing 261; spacer 27; hardware compartment 28; branch pipe 29; first pipe 291; first open end 2911; second pipe 292; second open end 2921; third pipe 293; third open end 2931; hub pipe 290; pipe A 294; open end A 2941; pipe B 295; open end B 2951; pipe C 296; open end C 2961; pipe D 297; open end D 2971; microporous channel 20.

DESCRIPTION OF EMBODIMENTS

A headset, also referred to as an earpiece, usually has two receivers separately worn on two ears. The headset may receive an audio signal sent by a media player, and convert the audio signal into an audible sound wave by using a driver unit close to the ear. A user can use the headset to listen to a sound alone without affecting another person. The headset can also isolate a sound in a surrounding environment, and may be used in a noisy environment, for example, in a recording room, on a journey, or during exercise, without being affected by noise in the surrounding environment. Therefore, whether the headset can well isolate the noise in the surrounding environment is quite important performance.

Figure 3:
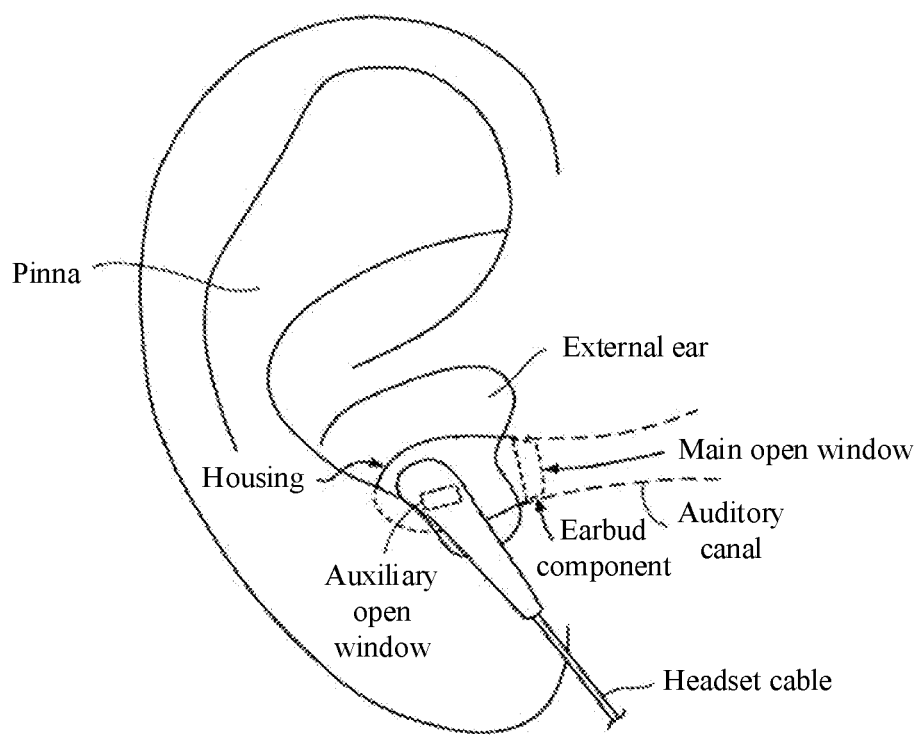
FIG. 3 is a schematic diagram in which a half-in-ear earphone is inserted into an ear.
Figure 4:
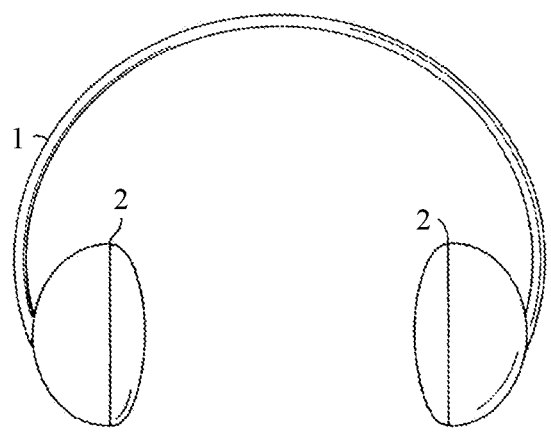
FIG. 4 is a three-dimensional schematic diagram of a headphone.

As shown in FIG. 1, FIG. 3, and FIG. 4, headsets generally include several types: a headphone (FIG. 4), an in-ear earphone (FIG. 1), and a half-in-ear earphone (FIG. 3). The in-ear earphone and a half-in-ear earphone usually include an earbud component and a headset cable connected to the earbud component. As shown in FIG. 4, the headphone usually includes a headband 1, earmuff components 2 connected to two ends of the headband 1, and a headset cable. The headband is worn on a head of a user. It should be noted that headset cables of headsets such as the headphone, the in-ear earphone, and the half-in-ear earphone may be omitted, and the headset receives an audio signal through wireless communication such as Bluetooth.

Figure 2:
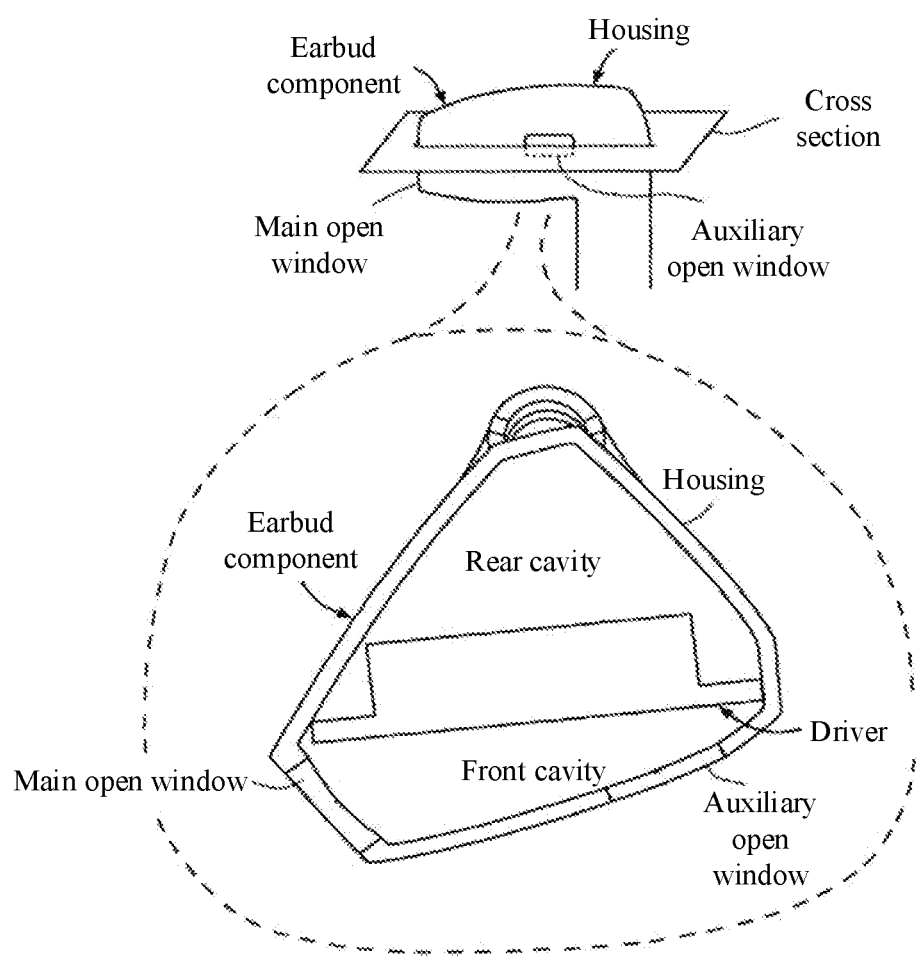
FIG. 2 is a perspective view of a half-in-ear earphone and a sectional view of a cross section indicated in the figure.
Figure 5:
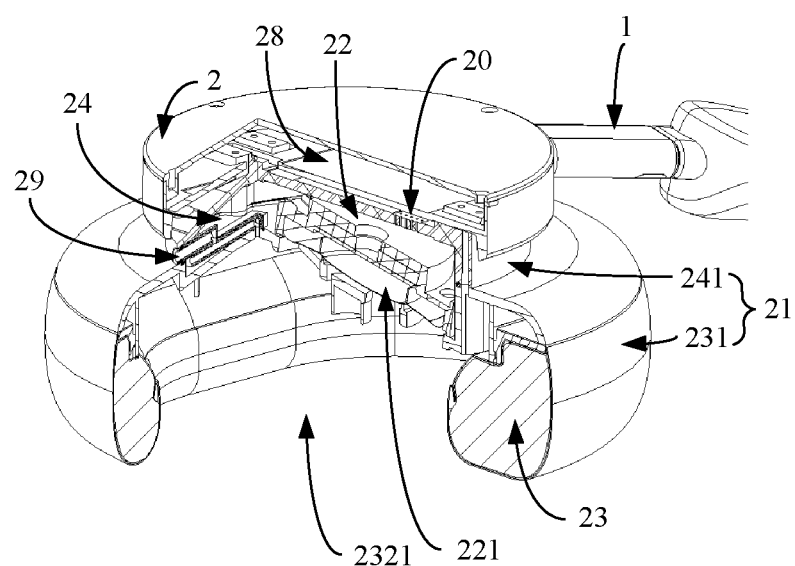
FIG. 5 is a partial sectional view of an earmuff component according to this application.

As shown in FIG. 1, FIG. 2, and FIG. 5, both the earbud component and the earmuff component 2 may be referred to as headset receivers. The earbud component and the earmuff component 2 may have different specific sizes and shapes, but have a same main internal structure. The structure usually includes a housing 21 and a driver 22 located inside the housing 21. Space inside the housing 21 is divided into a plurality of cavities through isolation. A cavity related to acoustic performance of the headset is a sound cavity, and one of cavities that barely affect the acoustic performance of the headset is a hardware compartment 28 (refer to FIG. 5). The sound cavity may include a front cavity 23 and a rear cavity 24 that are disposed adjacent to each other, and the hardware compartment 28 surrounds the outside of the rear cavity 24. In the hardware compartment 28, a battery and a chip may be placed, and a circuit board may be further disposed. The hardware compartment 28 is completely isolated from the rear cavity 24, and therefore barely affects the acoustic performance of the headset.

As shown in FIG. 1, FIG. 2, FIG. 5, FIG. 6, FIG. 8, FIG. 10, FIG. 14, FIG. 16, FIG. 18, FIG. 20, FIG. 22, FIG. 24, and FIG. 26, a sidewall surrounding the front cavity 23 is a front cavity housing 231, and a sidewall surrounding the rear cavity 24 is a rear cavity housing 241. A junction between the front cavity 23 and the rear cavity 24 is disposed in neither the front cavity housing 231 nor the rear cavity housing 241. A diaphragm 221 of the driver 22 is located at the junction between the front cavity 23 and the rear cavity 24. One side of the diaphragm 221 faces the front cavity 23, and the other side faces the rear cavity 24. The diaphragm 221 vibrates, so that sound waves are transmitted to the front cavity 23 and the rear cavity 24. Another component of the driver 22 may be located in the front cavity 23, or may be located in the rear cavity 24. Because sound waves in the front cavity 23 are transmitted to an ear of a user. In order not to interfere with the sound waves in the front cavity 23, another component of the driver 22 may be placed in the rear cavity 24, or disposed at the junction between the front cavity 23 and the rear cavity 24.

The front cavity 23 and the rear cavity 24 may be isolated from each other by using the driver 22. Alternatively, a baffle 25 may be disposed in the earmuff component, the driver 22 may be installed on the baffle 25, and the front cavity 23 and the rear cavity 24 may be isolated from each other by using the baffle 25 and the driver 22.

As shown in FIG. 14, FIG. 16, FIG. 18, FIG. 20, FIG. 22, FIG. 24, and FIG. 26, the hardware compartment 28 may be alternatively reconstructed into an additional rear cavity 26, and the additional rear cavity 26 affects the acoustic performance of the headset as a part of the sound cavity. After the hardware compartment 28 is used as the additional rear cavity 26, the battery, the chip, and the like that are placed in the hardware compartment 28 may be transferred to another compartment that is not used as the sound cavity. Certainly, the battery, the chip, and the like may still be placed in the additional rear cavity 26. If the hardware compartment 28 is used as the additional rear cavity 26, there are special requirements on a structure of the hardware compartment 28. The following describes the requirements one by one.

As shown in FIG. 14, FIG. 16, FIG. 18, FIG. 20, FIG. 22, FIG. 24, and FIG. 26, the additional rear cavity 26 surrounds the outside of the rear cavity 24, and the additional rear cavity 26 and the rear cavity 24 are isolated from each other by using the rear cavity housing 241. The additional rear cavity 26 is nested on the rear cavity 24, and the additional rear cavity 26 exists between the rear cavity 24 and an external environment. One side of the rear cavity 24 is adjacent to the front cavity 23, and the other side is adjacent to the additional rear cavity 26. The rear cavity 24 is surrounded by the front cavity 23 and the additional rear cavity 26. The front cavity 23 and the additional rear cavity 26 are disposed adjacent to each other, and are isolated from each other by using a spacer 27. A part other than the spacer 27 and the rear cavity housing 241 in a sidewall surrounding the additional rear cavity 26 is an additional rear cavity housing 261.

The front cavity housing 231 may be used as a part of the housing 21 of the headset, and the additional rear cavity housing 261 may also be used as a part of the housing 21. When the additional rear cavity 26 is not disposed, the rear cavity housing 241 may also be used as a part of the housing 21 of the headset.

As shown in FIG. 1, FIG. 2, FIG. 5, FIG. 6, FIG. 8, FIG. 10, FIG. 14, FIG. 16, FIG. 18, FIG. 20, FIG. 22, FIG. 24, and FIG. 26, an open window 2321 is disposed in the front cavity housing 231, and the open window 2321 connects the front cavity 23 and the external environment. An end that is of the front cavity housing and at which the open window 2321 is disposed is a front end 232, an earpad may be disposed on an outer surface of the front end 232, and the earpad is in contact with a pinna of the user. The earpad has a soft material, and can provide a sense of comfortable touch for the user.

As shown in FIG. 5, the headset cable 3 may pass through the rear cavity housing 241 and be connected to the driver 22. When the additional rear cavity 26 is disposed, the headset cable 3 may pass through the additional rear cavity housing 261 and the rear cavity housing 241, and be connected to the driver 22.

Generally, internal space of the front cavity 23 may be larger than internal space of the rear cavity 24.

Earbud components of the in-ear earphone and the half-in-ear earphone may be inserted into an auditory canal of the user, and therefore are usually relatively small. An earmuff component of the headphone may cover the pinna of the user, and is usually relatively large.

When the headphone is in use, the earmuff component is connected to the auditory canal of the user by using the open window 2321.

When in use, a front end of a front cavity housing of an earbud component of the in-ear earphone is in close contact with an inner wall of the auditory canal, to close the auditory canal of the user, and a front cavity of the earbud component communicates with the auditory canal of the user by using the open window.

As shown in FIG. 3, an open window disposed in a front cavity housing of an earbud component of the half-in-ear earphone includes a main open window and an auxiliary open window, and the main open window is located at a front end of the front cavity housing of the earbud component of the half-in-ear earphone. When the half-in-the-ear earphone is in use, the earbud component of the half-in-the-ear earphone is placed in the auditory canal, the main open window faces the inside of the auditory canal, the auxiliary open window faces the outside of the ear, and the auxiliary open window leaks some sound energy that is not required to an atmosphere, so that atmospheric pressure in the auditory canal can be relatively balanced, and the user feels relatively comfortable.

The driver is configured to: receive an audio signal from the headset cable, and convert the audio signal into a sound wave. The driver is used to generate a sound, and therefore may also be referred to as a driver unit.

As shown in FIG. 5, FIG. 6, FIG. 8, FIG. 10, FIG. 14, FIG. 16, FIG. 18, FIG. 20, FIG. 22, FIG. 24, and FIG. 26, this application provides a new earmuff component 2. A branch pipe 29 is disposed in the earmuff component 2, and the branch pipe 29 connects the front cavity 23, the rear cavity 24, and the external environment, so that a low-pass filter effect can be achieved, and middle-band and high-band sound waves entering the sound cavity from the external environment can be effectively isolated, thereby achieving good noise reduction performance. Because the earbud component has a similar internal structure to the earmuff component 2, the following embodiments are also applicable to the earbud component.

Figure 6:
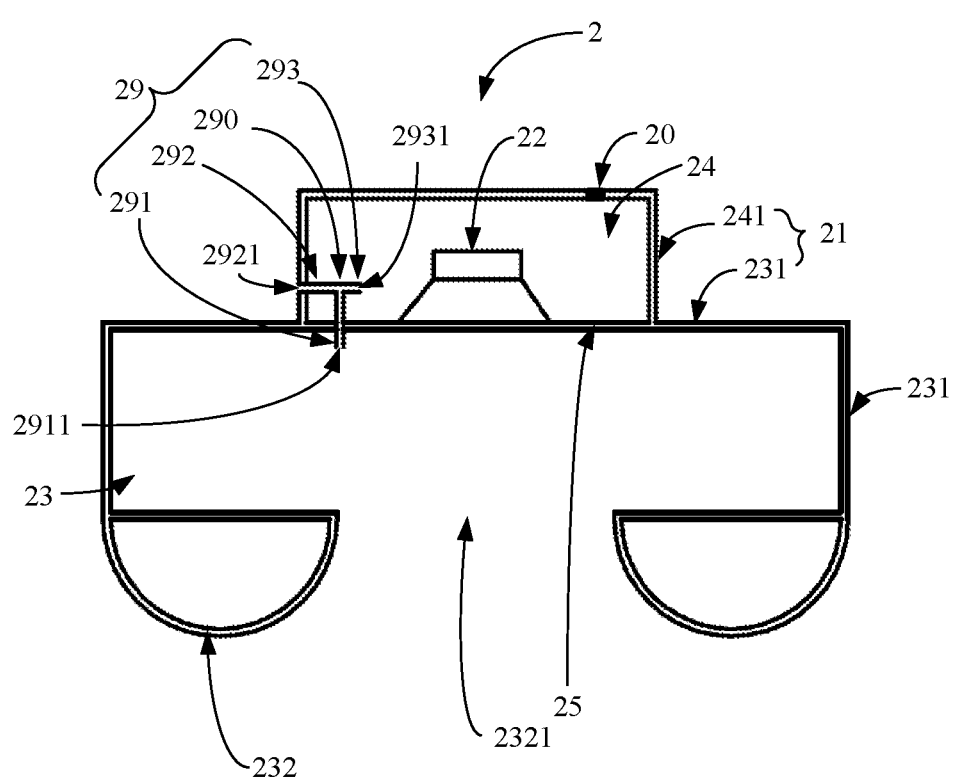
FIG. 6 is a schematic diagram of a sound cavity inside an earmuff component according to this application, where a branch pipe of a T-shaped three-way pipe form is disposed in the sound cavity.
Figure 8:
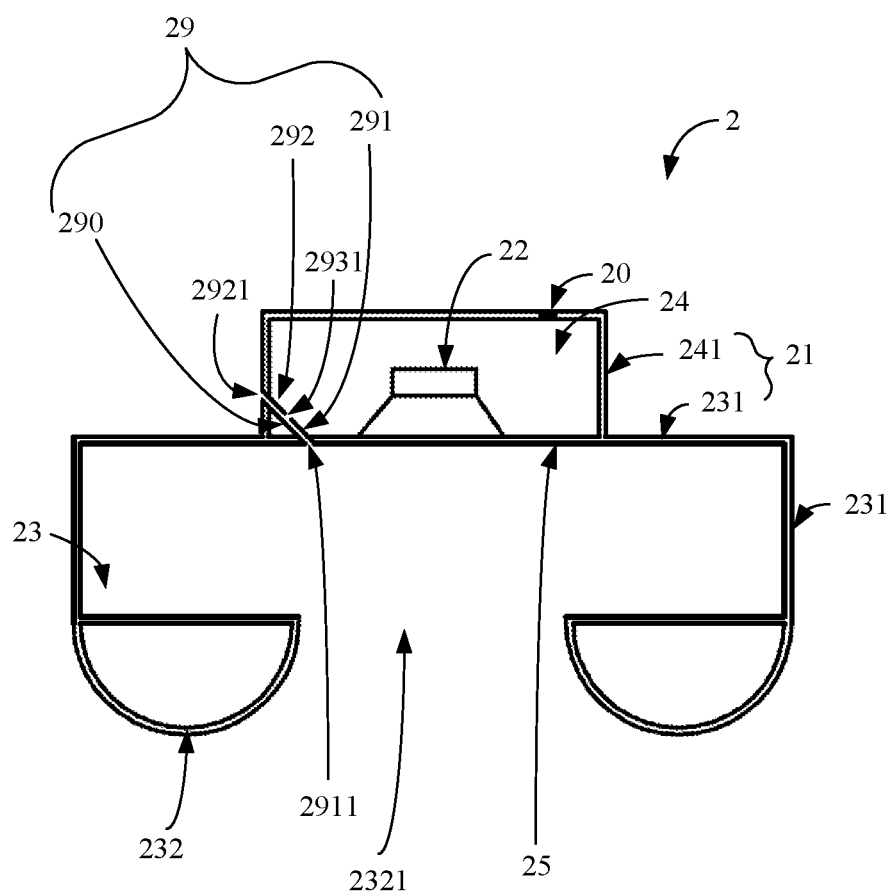
FIG. 8 is a schematic diagram of a sound cavity inside an earmuff component according to this application, where a branch pipe of an I-shaped three-way pipe form is disposed in the sound cavity.
Figure 10:
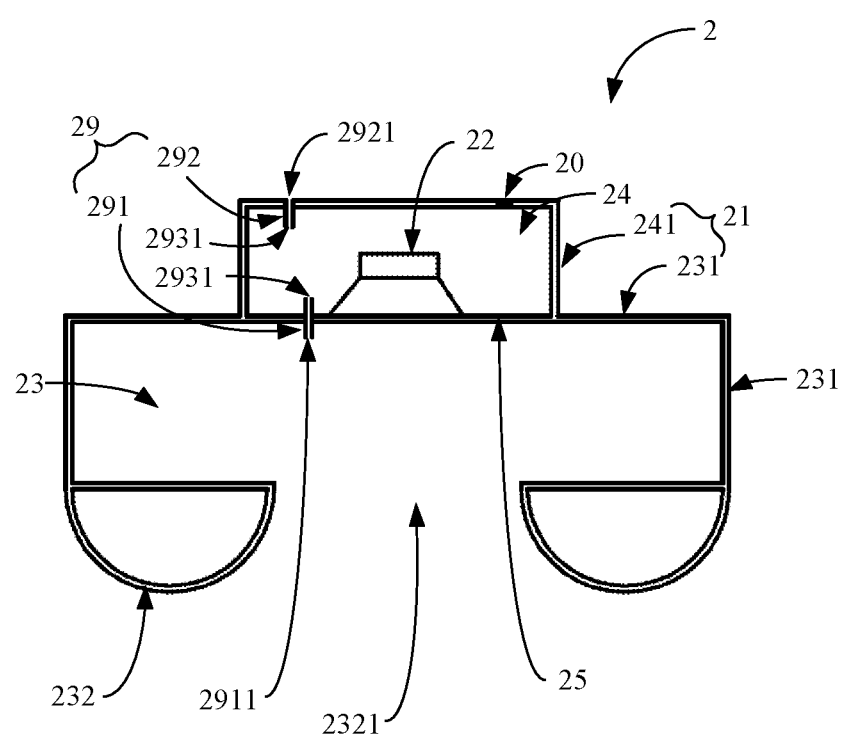
FIG. 10 is a schematic diagram of a sound cavity inside an earmuff component according to this application, where a branch pipe of a two-way pipe form is disposed in the sound cavity.

The branch pipe 29 may be designed in two forms. For the first form, as shown in FIG. 5, FIG. 6, and FIG. 8, a structural form of a three-way pipe is used, the three-way pipe connects three regions, and the three regions are the front cavity 23, the rear cavity 24, and the external environment. For the second form, as shown in FIG. 10, a structural form of a plurality of separated two-way pipes is used. The two-way pipe is configured to connect two adjacent areas, for example, a two-way pipe connecting the front cavity 23 and the rear cavity 24 and a two-way pipe connecting the rear cavity 24 and the external environment.

As shown in FIG. 5, FIG. 6, and FIG. 8, the three-way pipe includes a hub pipe 290, a first pipe 291, a second pipe 292, and a third pipe 293. The first pipe 291, the second pipe 292, and the third pipe 293 are all connected to the hub pipe 290. There may be one or more first pipes 291, and the first pipe 291 may include one or more branches. There may be one or more second pipes 292, and the second pipe 292 may also include one or more branches. There may be one or more third pipes 293, and the third pipe 293 may also include one or more branches. The hub pipe 290 is located in the rear cavity 24.

An end that is of the first pipe 291 and that is connected to the front cavity 23 is a first open end 2911, and one or more first openings are disposed in the first open end 2911. An end that is of the third pipe 293 and that is connected to the rear cavity 24 is a third open end 2931, and one or more third openings are disposed in the third open end 2931. An end that is of the second pipe 292 and that is connected to the external environment is a second open end 2921, and one or more second openings are disposed in the second open end 2921. The first open end 2911 extends toward the front cavity 23, and is connected to the front cavity 23 by using the first opening, and the second open end 2921 extends toward the outside of the rear cavity housing 241, and is connected to the outside of the rear cavity housing 241 by using the second opening.

Refer to FIG. 6 and FIG. 8. One or more first through-holes may be disposed in the baffle 25, and the first through-holes connect the front cavity 23 and the rear cavity 24. The first open end 2911 is plugged in the first through-hole, and the first open end 2911 is connected to the front cavity 23 by using the first through-hole. The first open end 2911 may pass through the first through-hole, protrude outside the first through-hole, and extend into the front cavity 23, or the first open end 2911 may be hidden inside the first through-hole. The first through-hole and the first open end 2911 may be detachably connected, or may be fastened or integrated together.

When no baffle is disposed, because the driver 22 is located at the junction between the front cavity 23 and the rear cavity 24, a first through-hole may be disposed in the driver 22, and the first through-hole disposed in the driver 22 still connects the front cavity 23 and the rear cavity 24. However, the first through-hole disposed in the driver 22 cannot be disposed in the diaphragm, and may be disposed outside the diaphragm. When a plurality of first through-holes need to be disposed, some of the first through-holes may be disposed in the baffle 25, and the other first through-holes may be disposed in a part outside the diaphragm of the driver 22. For any one of the first through-holes, one part may be located in the baffle 25, and the other part may be located outside the diaphragm of the driver 22.

Refer to FIG. 5, FIG. 6, and FIG. 8. One or more second through-holes may be disposed in the rear cavity housing 241, and the second through-holes connect the rear cavity 24 and the external environment. The second open end 2921 is plugged in the second through-hole, and the second open end 2921 is connected to the external environment by using the second through-hole. The second open end 2921 may pass through the second through-hole, and protrude outside the rear cavity housing 241, or the second open end 2921 may be hidden inside the second through-hole. The second through-hole and the second open end 2921 may be detachably connected, or may be fastened or integrated together. When the hardware compartment 28 is disposed outside the rear cavity 24, the hardware compartment 28 is connected to the external environment. The second through-hole connects the rear cavity 24 and the hardware compartment 28, which equivalently means that the second through-hole connects the rear cavity 24 and the external environment.

A length of the third pipe 293 may be shorter than that of the first pipe 291, and may also be shorter than that of the second pipe 292. Even the third pipe 293 may be omitted, leaving only the third opening in the hub pipe 290. When the second pipe 292 is disposed, the branch pipe 29 may be in a T-shaped structure (refer to FIG. 6). When the second pipe 292 is omitted, the branch pipe 29 may be in an I-shaped structure (refer to FIG. 8).

Figure 7:
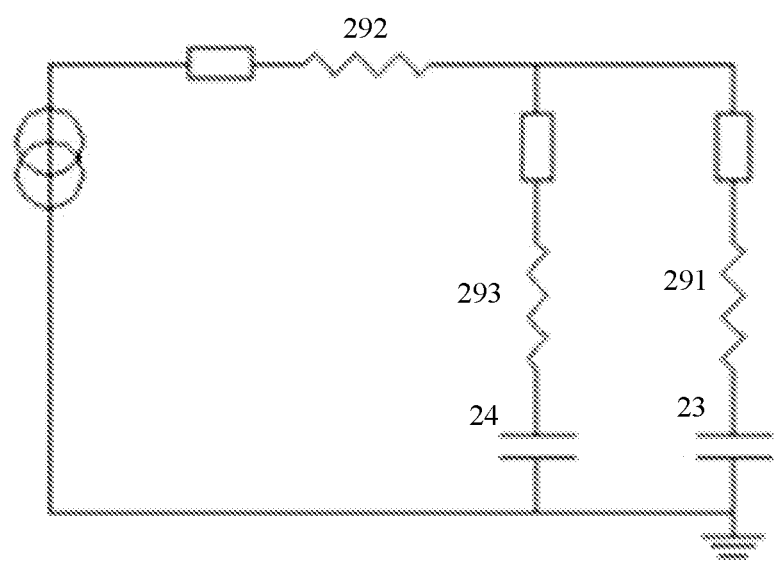
FIG. 7 is a schematic diagram in which the branch pipe and the sound cavity of the earmuff component shown in FIG. 6 are equivalent to a capacitor and an inductor, where element reference numerals of the capacitor and the inductor are element reference numerals of parts of the corresponding sound cavity or branch pipe.
Figure 9:
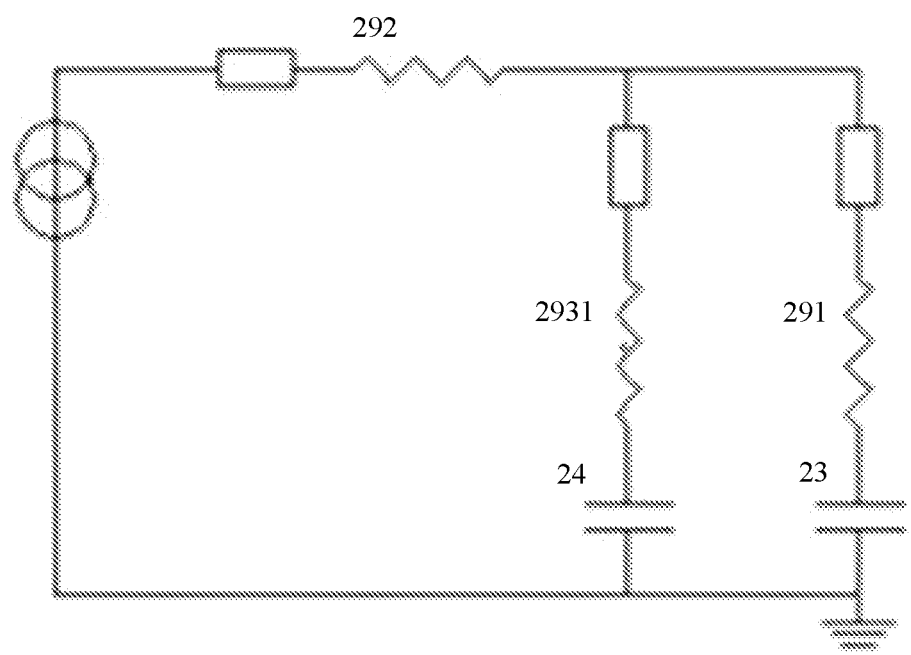
FIG. 9 is a schematic diagram in which the branch pipe and the sound cavity of the earmuff component shown in FIG. 8 are equivalent to a capacitor and an inductor, where element reference numerals of the capacitor and the inductor are element reference numerals of parts of the corresponding sound cavity or branch pipe.

A part that is of the branch pipe 29 and that is located between the front cavity 23 and the external environment functions equivalently to a low-pass filter. Therefore, the part that is of the branch pipe 29 and that is located between the front cavity 23 and the external environment is referred to as a low-pass filter pipe. FIG. 7 is an equivalent circuit diagram of a connection form of the branch pipe and the sound cavity shown in FIG. 6. Two capacitors are equivalent to the front cavity and the rear cavity, the first pipe 291, the second pipe 292, and the third pipe 293 of the branch pipe are equivalent to three inductors, and sound waves are propagated in the capacitors and the inductors, and resonate with the capacitors and the inductors. FIG. 9 is an equivalent circuit diagram of a connection form of the branch pipe and the sound cavity shown in FIG. 8.

The branch pipe 29 connects the front cavity 23, the rear cavity 24, and the external environment, so that the low-pass filter pipe can have relatively large inductance, and therefore has relatively good low-pass filter performance. The low-pass filter pipe can allow a low-band sound wave entering from the external environment to pass through and filter out a high-band sound wave entering from the external environment, so that noise entering the front cavity from the external environment is reduced, and a relatively good passive noise reduction (Passive noise reduction, PNR) effect is achieved.

When the branch pipe is in the forms shown in FIG. 6 and FIG. 8, the low-pass filter pipe is the first pipe 291 and the second pipe 292.

In addition, the branch pipe in this application connects the front cavity, the rear cavity, and the external environment, to couple both the front cavity and the rear cavity to the external environment of the earmuff component, so that atmospheric pressure in the front cavity and the rear cavity can be released, and atmospheric pressure in the front cavity, atmospheric pressure in the rear cavity, and atmospheric pressure in the external environment can be balanced. In this way, reliability of the diaphragm under impact of pressure pulsations of sound waves can be improved, and acoustic comfort of a human ear can be improved.

In this application, the branch pipe connects the rear cavity and the external environment, and a low-band sound wave in sound waves emitted by the driver resonates with the rear cavity and a part of the branch pipe, so that sensitivity of sound pressure level magnitude-frequency responses of the headset for middle-band and low-band sound waves can be improved.

As shown in FIG. 10, when the branch pipe 29 is in a structural form of a plurality of separated pipes, the branch pipe 29 includes a first pipe 291 and a second pipe 292 that are separated, the first pipe 291 connects the front cavity 23 and the rear cavity 24, and the second pipe 292 connects the rear cavity 24 and the external environment.

The first open end 2911 is disposed at one end of the first pipe 291, one or more third openings are disposed at the other end, and the third openings are connected to the rear cavity 24. The second open end 2921 is disposed at one end of the second pipe 292, one or more third openings are disposed at the other end, and the third openings are connected to the rear cavity 24. For a manner of disposing the first open end 2911 and a connection manner between the first open end 2911 and the front cavity 23, refer to the foregoing embodiment. For a manner of disposing the second open end 2921 and a connection manner between the second open end 2921 and the external environment, refer to the foregoing embodiment.

The end that is of the first pipe 291 and at which the third opening is disposed is plugged in the first through-hole, and the end that is of the first pipe 291 and at which the third opening is disposed is connected to the rear cavity 24 by using the first through-hole. The end that is of the first pipe 291 and at which the third opening is disposed may pass through the first through-hole, protrude outside the first through-hole, and extend into the rear cavity 24, or the end that is of the first pipe 291 and at which the third opening is disposed may be hidden inside the first through-hole. The end that is of the first pipe 291 and at which the third opening is disposed and the first through-hole may be detachably connected, or may be fastened or integrated together.

The end that is of the second pipe 292 and at which the third opening is disposed is plugged in the second through-hole of the rear cavity housing 241, and the end that is of the second pipe 292 and at which the third opening is disposed is connected to the rear cavity 24 by using the second through-hole. The end that is of the second pipe 292 and at which the third opening is disposed may pass through the second through-hole, and protrude outside the second through-hole, or the end that is of the second pipe 292 and at which the third opening is disposed is hidden inside the second through-hole. The end that is of the second pipe 292 and at which the third opening is disposed and the second through-hole may be detachably connected, or may be fastened or integrated together.

The second pipe 292 may be omitted, and the rear cavity 24 and the external environment are connected by using the one or more second through-holes disposed in the rear cavity housing 241.

Figure 11:
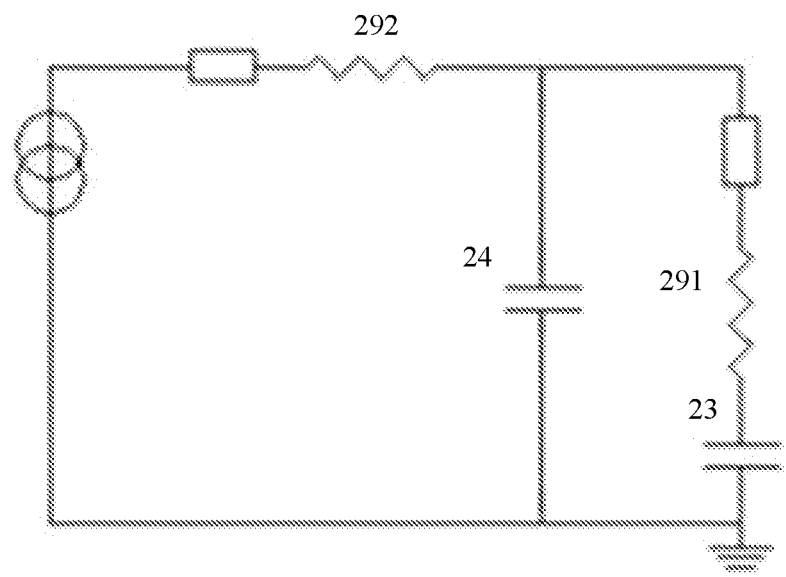
FIG. 11 is a schematic diagram in which the branch pipe and the sound cavity of the earmuff component shown in FIG. 10 are equivalent to a capacitor and an inductor, where element reference numerals of the capacitor and the inductor are element reference numerals of parts of the corresponding sound cavity or branch pipe.

FIG. 11 is an equivalent circuit diagram of a connection form of the branch pipe and the sound cavity shown in FIG. 10. When the branch pipe is in a structural form of a plurality of separated pipes shown in FIG. 10, the low-pass filter pipe is the first pipe 291 and the second pipe 292.

Refer to FIG. 14 to FIG. 27. When the additional rear cavity 26 is disposed in the earmuff component 2 provided in this application, the branch pipe 29 is further connected to the additional rear cavity 26. The spacer 27 is disposed between the front cavity 23 and the additional rear cavity 26, and the rear cavity housing 241 is disposed between the additional rear cavity 26 and the rear cavity 24. The branch pipe 29 may connect the front cavity 23, the rear cavity 24, the additional rear cavity 26, and the external environment in the following three manners.

Refer to FIG. 14 to FIG. 19. In the first manner, the branch pipe 29 is in a structural form of a four-way pipe, the four-way pipe is configured to connect four regions, and the four regions are the front cavity 23, the rear cavity 24, the additional rear cavity 26, and the external environment.

Refer to FIG. 20 to FIG. 23. In the second manner, the branch pipe 29 is in a structural form of a combination of a three-way pipe and a two-way pipe, the three-way pipe connects the front cavity, the rear cavity, and the additional rear cavity, and the two-way pipe connects the additional rear cavity and the external environment. Alternatively, the three-way pipe may connect the front cavity, the additional rear cavity, and the external environment, and the two-way pipe may connect the rear cavity and the additional rear cavity. Alternatively, the three-way pipe may connect the rear cavity, the additional rear cavity, and the external environment, and the two-way pipe may connect the front cavity and the rear cavity. Alternatively, the three-way pipe may connect the rear cavity, the additional rear cavity, and the external environment, and the two-way pipe may connect the front cavity and the additional rear cavity.

There may be one or more three-way pipes, and there may be one or more two-way pipes. One or more types of pipes may connect any two regions, or may be repeatedly disposed. For example, two types of three-way pipes are used: One type of three-way pipe connects the front cavity, the rear cavity, and the additional rear cavity, and the other type of three-way pipe connects the rear cavity, the additional rear cavity, and the external environment. Alternatively, a combination of two types of two-way pipes and one type of three-way pipe is used: The one type of three-way pipe connects the front cavity, the rear cavity, and the additional rear cavity, one type of two-way pipe connects the additional rear cavity and the external environment, and the other type of two-way pipe connects the front cavity and the rear cavity.

For a specific design form of the three-way pipe, refer to a design form of the three-way pipe in the foregoing embodiment in which the additional rear cavity is not disposed. For a specific design form of the two-way pipe, refer to a design form of the two-way pipe in the foregoing embodiment in which the additional rear cavity is not disposed.

It should be noted that if a three-way pipe is connected to the front cavity, and an open end of the three-way pipe is connected to the external environment, a hub pipe of the three-way pipe is located in the rear cavity or the additional rear cavity, or the hub pipe of the three-way pipe may cross the rear cavity and the additional rear cavity. In addition, a two-way pipe cannot be disposed to directly connect the front cavity and external environment.

Figure 20:
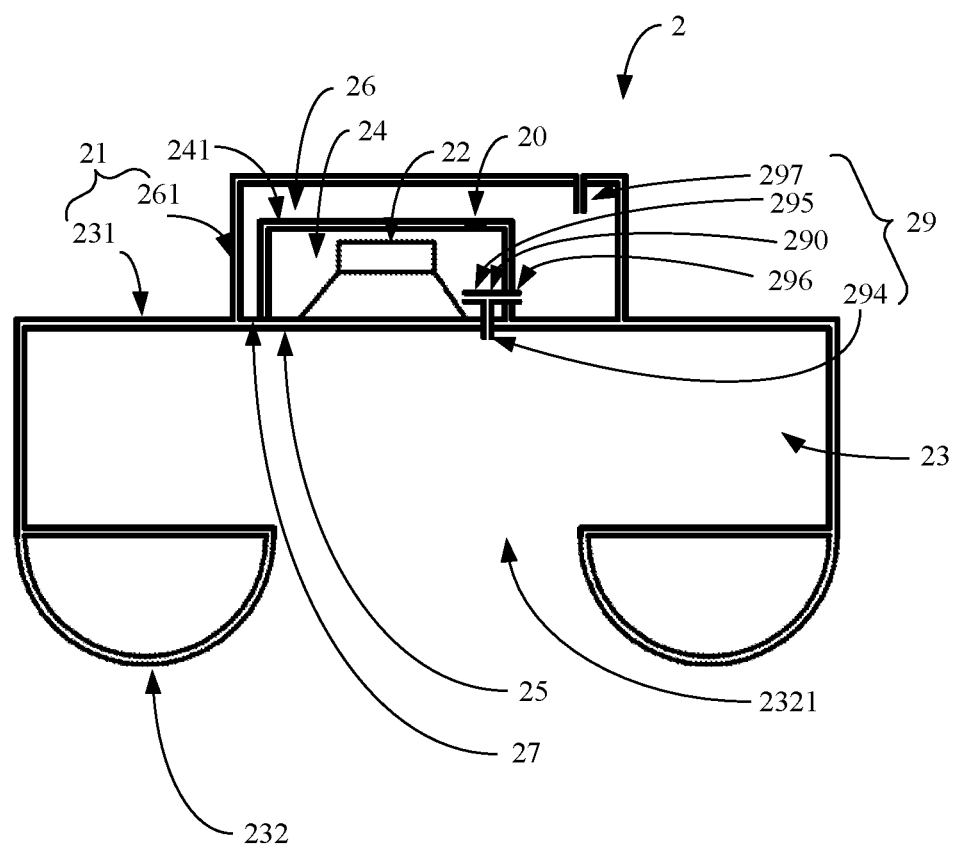
FIG. 20 is a schematic diagram of a sound cavity inside an earmuff component according to this application, where the sound cavity includes an additional rear cavity, a branch pipe disposed in the sound cavity includes a three-way pipe and a two-way pipe, the three-way pipe connects a front cavity, a rear cavity, and the additional rear cavity, the two-way pipe connects the additional rear cavity and an external atmosphere, and a hub pipe of the three-way pipe is located in the rear cavity.
Figure 21:
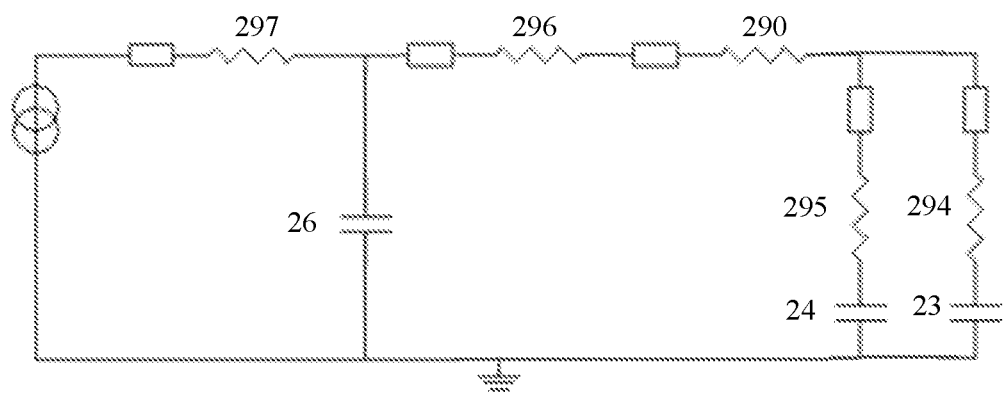
FIG. 21 is a schematic diagram in which the branch pipe and the sound cavity of the earmuff component shown in FIG. 20 are equivalent to a capacitor and an inductor, where element reference numerals of the capacitor and the inductor are element reference numerals of parts of the corresponding sound cavity or branch pipe.
Figure 22:
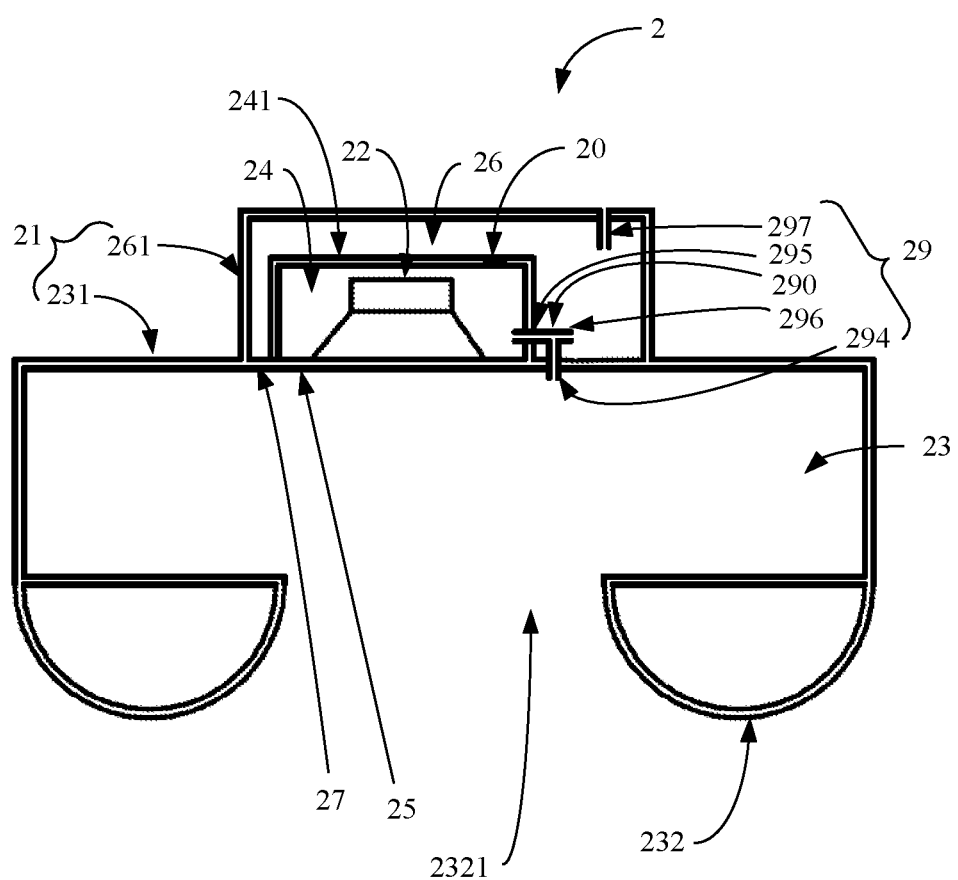
FIG. 22 is a schematic diagram of a sound cavity inside an earmuff component according to this application, where the sound cavity includes an additional rear cavity, a branch pipe disposed in the sound cavity includes a three-way pipe and a two-way pipe, the three-way pipe connects a front cavity, a rear cavity, and the additional rear cavity, the two-way pipe connects the additional rear cavity and an external atmosphere, and a hub pipe of the three-way pipe is located in the additional rear cavity.
Figure 23:
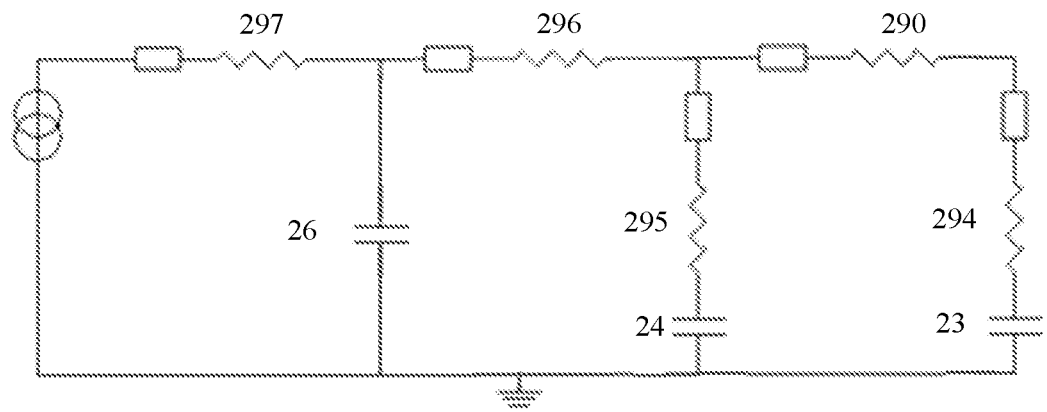
FIG. 23 is a schematic diagram in which the branch pipe and the sound cavity of the earmuff component shown in FIG. 22 are equivalent to a capacitor and an inductor, where element reference numerals of the capacitor and the inductor are element reference numerals of parts of the corresponding sound cavity or branch pipe.

FIG. 21 is an equivalent circuit diagram of a connection form of the branch pipe and the sound cavity shown in FIG. 20. FIG. 23 is an equivalent circuit diagram of a connection form of the branch pipe and the sound cavity shown in FIG. 22. When the branch pipe is in the form shown in FIG. 20, the low-pass filter pipe is a pipe A 294, a pipe C 296, a hub pipe 290, and a pipe D 297. When the branch pipe is in the form shown in FIG. 22, the low-pass filter pipe is a pipe A 294, a hub pipe 290, a pipe C 296, and a pipe D 297.

Refer to FIG. 24 to FIG. 27. In the third manner, the branch pipe 29 is in a structural form of a plurality of separated two-way pipes, the two-way pipe is configured to connect any two of adjacent regions, and the regions are the front cavity, the rear cavity, the additional rear cavity, and the external environment. However, the two-way pipe cannot be used to connect the front cavity and the external environment. Based on different connected regions of the two-way pipe, there are the following four types of two-way pipes: The first type of two-way pipe connects the front cavity and the rear cavity, the second type of two-way pipe connects the front cavity and the additional rear cavity, the third type of two-way pipe connects the rear cavity and the additional rear cavity, and the fourth type of two-way pipe connects the additional rear cavity and the external environment. Each of the foregoing four types of two-way pipes may include one or more two-way pipes. All the four types of two-way pipes may be disposed on the noise reduction headset; or only the first type of two-way pipe connecting the front cavity and the rear cavity, the third type of two-way pipe connecting the rear cavity and the additional rear cavity, and the fourth type of two-way pipe connecting the additional rear cavity and the external environment may be disposed, or only the second type of two-way pipe connecting the front cavity and the additional rear cavity, the third type of two-way pipe connecting the rear cavity and the additional rear cavity, and the fourth type of two-way pipe connecting the additional rear cavity and the external environment may be disposed. For a specific design form of the two-way pipe, refer to a design form of the two-way pipe in the foregoing embodiment in which the additional rear cavity is not disposed.

Figure 24:
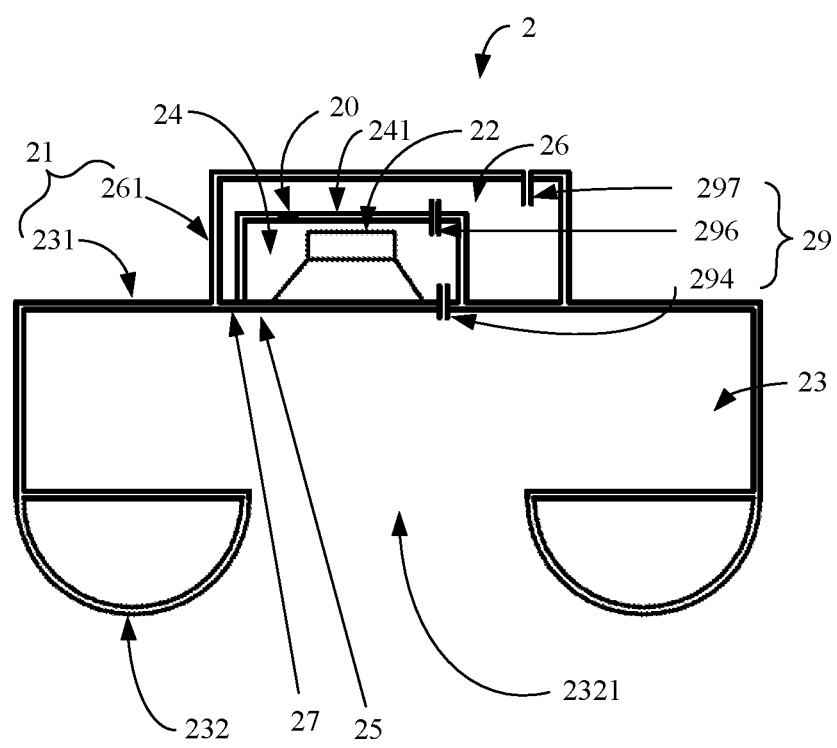
FIG. 24 is a schematic diagram of a sound cavity inside an earmuff component according to this application, where the sound cavity includes an additional rear cavity, a branch pipe is disposed in the sound cavity, and the branch pipe includes a two-way pipe connecting a front cavity and a rear cavity, a two-way pipe connecting the rear cavity and the additional rear cavity, and a two-way pipe connecting the additional rear cavity and an external atmosphere.
Figure 25:
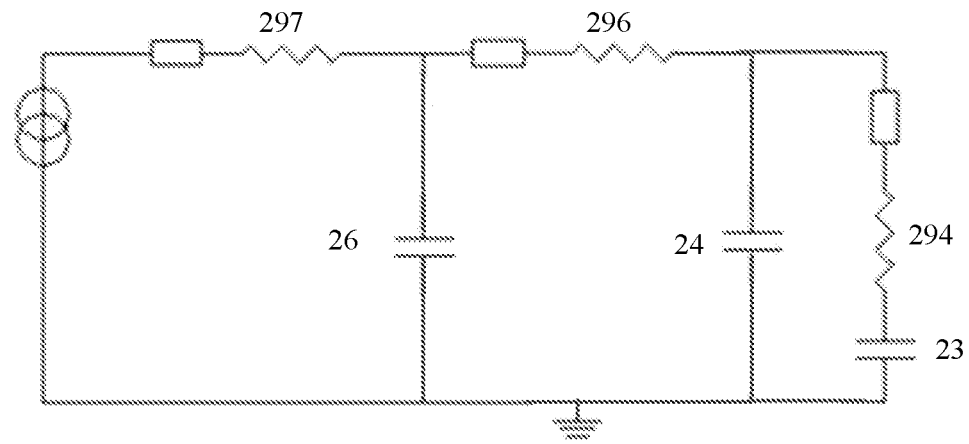
FIG. 25 is a schematic diagram in which the branch pipe and the sound cavity of the earmuff component shown in FIG. 24 are equivalent to a capacitor and an inductor, where element reference numerals of the capacitor and the inductor are element reference numerals of parts of the corresponding sound cavity or branch pipe.
Figure 26:
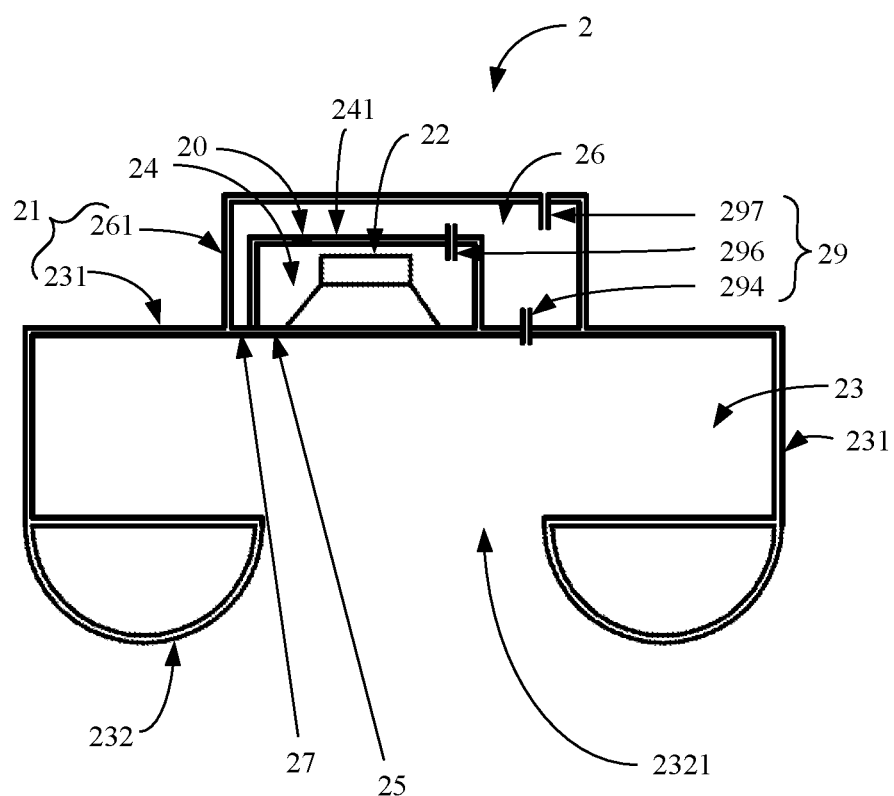
FIG. 26 is a schematic diagram of a sound cavity inside an earmuff component according to this application, where the sound cavity includes an additional rear cavity, a branch pipe is disposed in the sound cavity, and the branch pipe includes a two-way pipe connecting a front cavity and the additional rear cavity, a two-way pipe connecting the rear cavity and the additional rear cavity, and a two-way pipe connecting the additional rear cavity and an external atmosphere.
Figure 27:
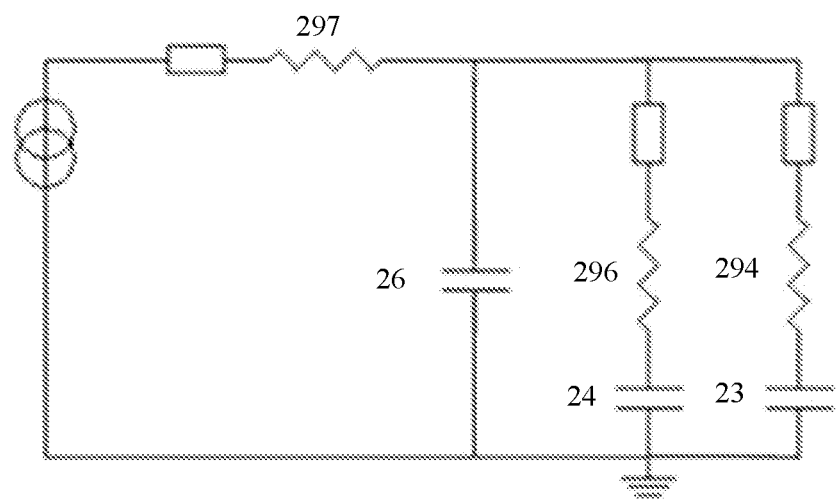
FIG. 27 is a schematic diagram in which the branch pipe and the sound cavity of the earmuff component shown in FIG. 26 are equivalent to a capacitor and an inductor, where element reference numerals of the capacitor and the inductor are element reference numerals of parts of the corresponding sound cavity or branch pipe.

FIG. 25 is an equivalent circuit diagram of a connection form of the branch pipe and the sound cavity shown in FIG. 24. FIG. 27 is an equivalent circuit diagram of a connection form of the branch pipe and the sound cavity shown in FIG. 26. When the branch pipe is in the form shown in FIG. 24, the low-pass filter pipe is a pipe A 294, a pipe C 296, and a pipe D 297. When the branch pipe is in the form shown in FIG. 26, the low-pass filter pipe is a pipe A 294 and a pipe D 297.

Refer to FIG. 14 to FIG. 19. The four-way pipe includes a pipe A 294, a pipe B 295, a pipe C 296, a pipe D 297, and a hub pipe 290. The pipe A 294, the pipe B 295, the pipe C 296, and the pipe D 297 are all connected to the hub pipe 290, there may be one or more pipes A 294, and the pipe A 294 may include one or more branches. There may be one or more pipes B 295, and the pipe B 295 may also include one or more branches. There may be one or more pipes C 296, and the pipe C 296 may also include one or more branches. There may be one or more pipes D 297, and the pipe D 297 may also include one or more branches. The hub pipe 290 may be located in the additional rear cavity 26; or the hub pipe 290 may cross the rear cavity 24 and the additional rear cavity 26, in other words, one part is located in the rear cavity 24, and the other part is located in the additional rear cavity 26.

An open end A 2941 of the pipe A 294 extends toward the front cavity 23, and is connected to the front cavity 23, one or more openings A are disposed in the open end A 2941, and the one or more openings A are connected to the front cavity 23. An open end B 2951 of the pipe B 295 extends toward the rear cavity 24, and is connected to the rear cavity 24, one or more openings B are disposed in the open end B 2951, and the one or more openings B are connected to the rear cavity 24. An open end C 2961 of the pipe C 296 extends toward the additional rear cavity 26, and is connected to the additional rear cavity 26, one or more openings C are disposed in the open end C 2961, and the one or more openings C are connected to the additional rear cavity 26. An open end D 2971 of the pipe D 297 extends toward the outside of the additional rear cavity housing 261, and is connected to the external environment, one or more openings D are disposed in the open end D 2971, and the one or more openings D are connected to the external environment.

An open end A 2941 of the first type of pipe A 294 may pass through the first through-hole between the front cavity 23 and the rear cavity 24, and be connected to the front cavity 23. The open end A 2941 of the first type of pipe A 294 may protrude outside the first through-hole, or may be hidden inside the first through-hole. The open end A 2941 of the first type of pipe A 294 and the first through-hole may be detachably connected, or may be fastened or integrated together. An open end A 2941 of the second type of pipe A 294 may also pass through a through-hole of the spacer 27 between the front cavity 23 and the additional rear cavity 26, and be connected to the front cavity 23. The open end A 2941 of the second type of pipe A 294 may protrude outside the through-hole of the spacer 27, or may be hidden inside the through-hole of the spacer 27. The open end A 2941 of the second type of pipe A 294 and the through-hole of the spacer 27 may be detachably connected, or may be fastened or integrated together. One or both of the first type of pipe A 294 and the second type of pipe A 294 are disposed in the four-way pipe.

An open end B 2951 of the first type of pipe B 295 may pass through a through-hole of the rear cavity housing 241, and is connected to the rear cavity 24. The open end B 2951 of the first type of pipe B 295 may protrude outside the through-hole of the rear cavity housing 241, or may be hidden inside the through-hole of the rear cavity housing 241. The open end B 2951 of the first type of pipe B 295 and the through-hole of the rear cavity housing 241 may be detachably connected, or may be fastened or integrated together. When the hub pipe 290 extends into the rear cavity 24, the second type of pipe B 295 is connected to the part that is of the hub pipe 290 and that is located in the rear cavity 24, and the second type of pipe B 295 does not need to pass through the through-hole of the rear cavity housing 241 between the rear cavity 24 and the additional rear cavity 26. In addition, the second type of pipe B 295 may be further simplified as one or more openings B, and the one or more openings B are disposed in the part that is of the hub pipe 290 and that is located in the rear cavity 24. One or both of the first type of pipe B 295 and the second type of pipe B 295 are disposed in the four-way pipe.

An open end C 2961 of the first type of pipe C 296 may also pass through the through-hole of the rear cavity housing 241, and is connected to the additional rear cavity 26. The open end C 2961 of the first type of pipe C 296 may protrude outside the through-hole of the rear cavity housing 241, or may be hidden inside the through-hole of the rear cavity housing 241. The open end C 2961 of the first type of pipe C 296 and the through-hole of the rear cavity housing 241 may be detachably connected, or may be fastened or integrated together. When the hub pipe 290 extends into the additional rear cavity, the second type of pipe C 296 is connected to the part that is of the hub pipe 290 and that is located in the additional rear cavity 26, and the second type of pipe C 296 does not need to pass through the through-hole of the rear cavity housing 241 between the rear cavity 24 and the additional rear cavity 26. In addition, the second type of pipe C 296 may be further simplified as one or more openings C, and the one or more openings C are disposed in the part that is of the hub pipe 290 and that is located in the additional rear cavity 26. One or both of the first type of pipe C 296 and the second type of pipe C 296 are disposed in the four-way pipe.

The open end D 2971 of the pipe D 297 may pass through a through-hole of the additional rear cavity housing 261, and is connected to the external environment. The open end D 2971 of the pipe D 297 may protrude outside the through-hole of the additional rear cavity housing 261, or may be hidden inside the through-hole of the additional rear cavity housing 261. The open end D 2971 of the pipe D 297 and the through-hole of the additional rear cavity housing 261 may be detachably connected, or may be fastened or integrated together.

Figure 14:
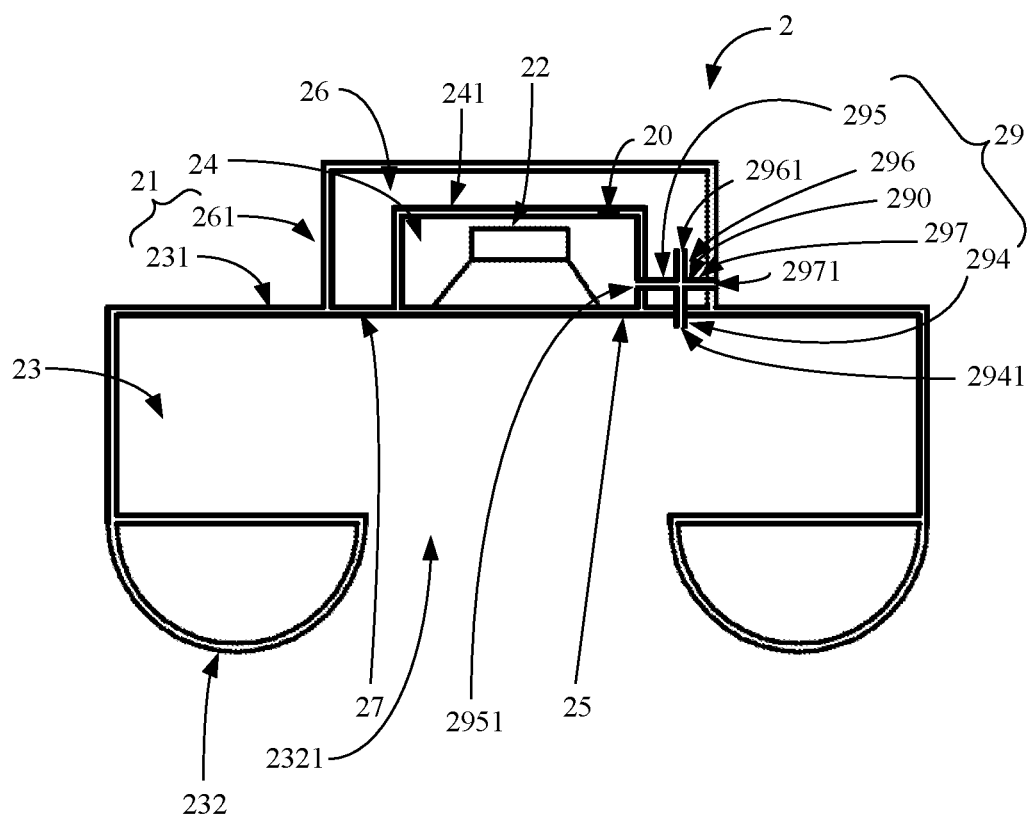
FIG. 14 is a schematic diagram of a sound cavity inside an earmuff component according to this application, where the sound cavity includes an additional rear cavity, a branch pipe of a four-way pipe form is disposed in the sound cavity, and a hub pipe of the branch pipe is located in the additional rear cavity.
Figure 15:
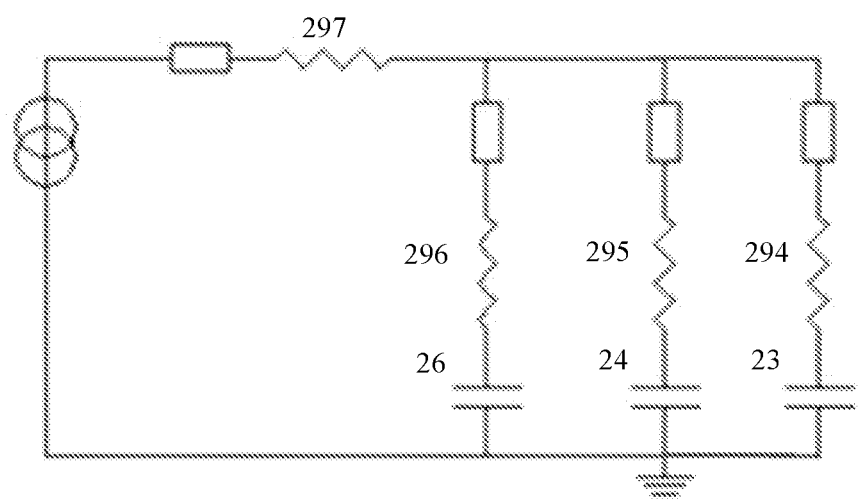
FIG. 15 is a schematic diagram in which the branch pipe and the sound cavity of the earmuff component shown in FIG. 14 are equivalent to a capacitor and an inductor, where element reference numerals of the capacitor and the inductor are element reference numerals of parts of the corresponding sound cavity or branch pipe.
Figure 16:
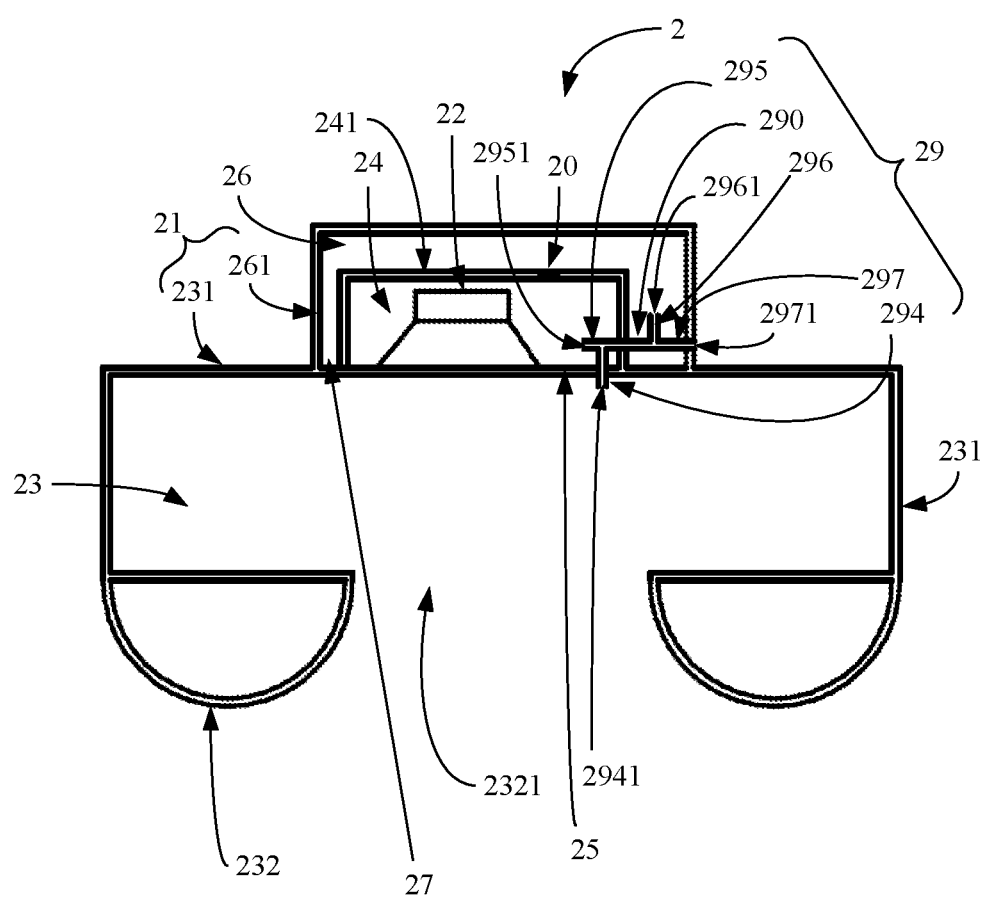
FIG. 16 is a schematic diagram of a sound cavity inside an earmuff component according to this application, where the sound cavity includes an additional rear cavity, a branch pipe of another four-way pipe form is disposed in the sound cavity, and a hub pipe of the branch pipe crosses a rear cavity and the additional rear cavity.
Figure 17:
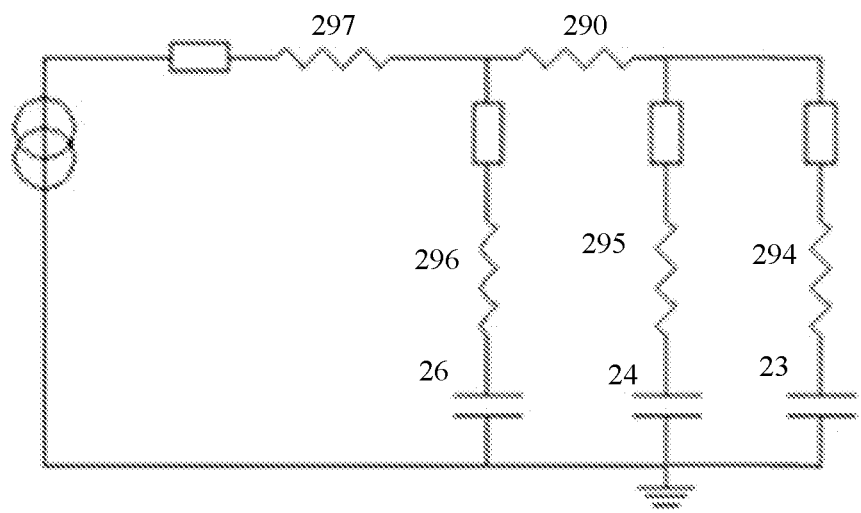
FIG. 17 is a schematic diagram in which the branch pipe and the sound cavity of the earmuff component shown in FIG. 16 are equivalent to a capacitor and an inductor, where element reference numerals of the capacitor and the inductor are element reference numerals of parts of the corresponding sound cavity or branch pipe.
Figure 18:
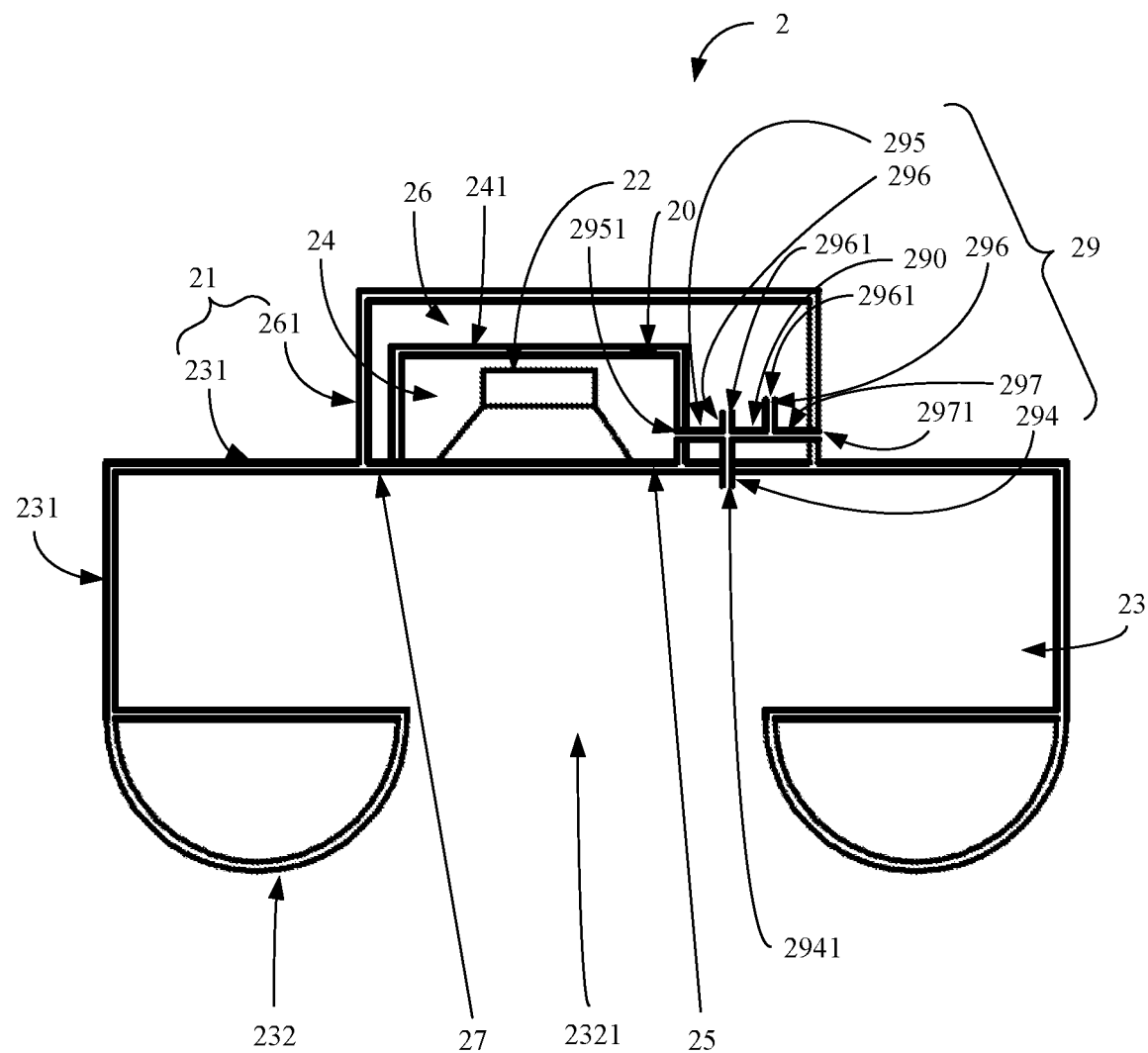
FIG. 18 is a schematic diagram of a sound cavity inside an earmuff component according to this application, where the sound cavity includes an additional rear cavity, a branch pipe of still another four-way pipe form is disposed in the sound cavity, a hub pipe of the branch pipe is located in the additional rear cavity, and two pipes C are connected to the additional rear cavity.
Figure 19:
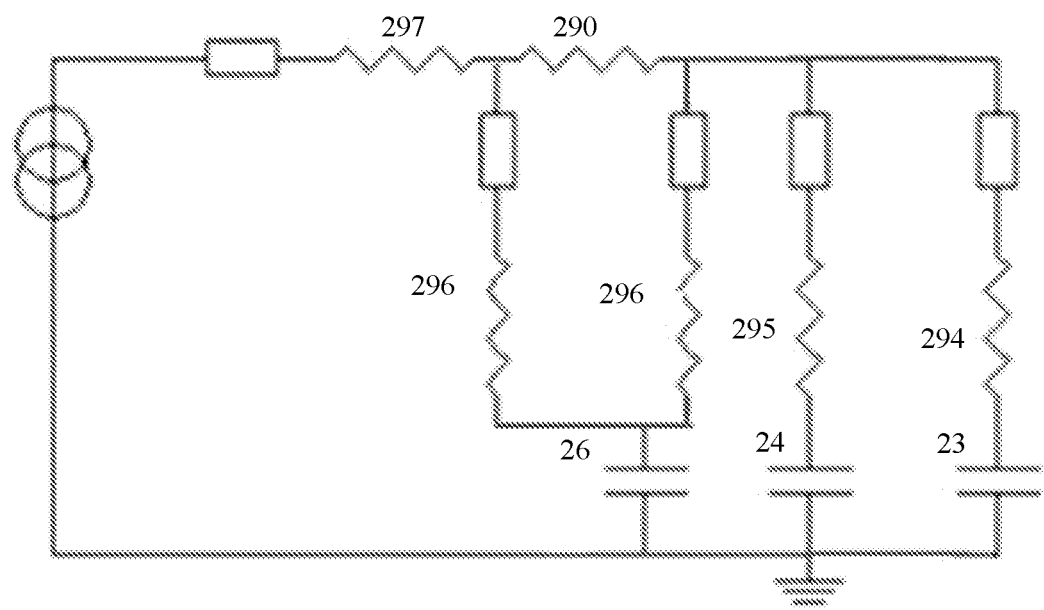
FIG. 19 is a schematic diagram in which the branch pipe and the sound cavity of the earmuff component shown in FIG. 18 are equivalent to a capacitor and an inductor, where element reference numerals of the capacitor and the inductor are element reference numerals of parts of the corresponding sound cavity or branch pipe.

FIG. 15 is an equivalent circuit diagram of a connection form of the branch pipe and the sound cavity shown in FIG. 14. FIG. 17 is an equivalent circuit diagram of a connection form of the branch pipe and the sound cavity shown in FIG. 16. FIG. 19 is an equivalent circuit diagram of a connection form of the branch pipe and the sound cavity shown in FIG. 18. When the branch pipe is in the form shown in FIG. 14, the low-pass filter pipe is a pipe A 294 and a pipe D 297. When the branch pipe is in the form shown in FIG. 16, the low-pass filter pipe is a pipe A 294, a hub pipe 290, and a pipe D 297. When the branch pipe is in the form shown in FIG. 18, the low-pass filter pipe is a pipe A 294, a hub pipe 290, and a pipe D 297.

When the additional rear cavity is disposed, the additional rear cavity is equivalent to a capacitor additionally added to a branch. This does not affect resonance between the rear cavity and a part of the branch pipe on a low band, but affects an overall sound pressure level magnitude-frequency response on another band.

The low-pass filter pipe may be an elongated pipe, and can use wall surface damping of a pipe wall and a low-pass filter function to suppress transmission of noise in the external environment, so that less middle-band and high-band noise energy enters the front cavity. Therefore, the elongated pipe has a relatively good noise reduction effect. For example, a ratio of a cross-sectional area to a length of a valid section of the low-pass filter pipe may be less than or equal to 4 mm$^2$/10 mm. The valid section is a pipe section that is in the low-pass filter pipe and that substantially affects filter performance.

If a pipe that is in the branch pipe and that is used as the low-pass filter pipe is a three-way pipe or a four-way pipe, there may be one or more openings in each open end of the low-pass filter pipe. When a plurality of openings are disposed in one open end, positions of the plurality of openings may be different. Because a propagation direction of a sound wave in the low-pass filter pipe is perpendicular to a traveling direction of the sound wave, the valid section of the low-pass filter pipe is a pipe section between closest openings between two ends of the low-pass filter pipe in an extension direction of the low-pass filter pipe. If cross-sectional areas of all parts of the valid section of the low-pass filter pipe are equal, a cross-sectional area of any part of the valid section of the low-pass filter pipe is used as the cross-sectional area of the valid section. If cross-sectional areas of all parts of the valid section of the low-pass filter pipe are unequal, the cross-sectional area of the valid section of the low-pass filter pipe is an average cross-sectional area. It is assumed that the valid section of the low-pass filter pipe includes x pipe sections with unequal cross-sectional areas, a cross-sectional area of the first section is W1, a length of the first section is Y1, a cross-sectional area of the second section is W2, a length of the second section is Y2, . . . , a cross-sectional area of the x$^{th}$ section is Wx, and a length of the x$^{th}$ section is Yx. The average cross-sectional area of the valid section is (W1×Y1+W2×Y2+ . . . +Wx×Yx)/(Y1+Y2+ . . . +Yx), and the length of the valid section is Y1+Y2+ . . . +Yx, where x is a positive integer greater than 1.

If pipes in the branch pipe that are used as the low-pass filter pipe are separated, for example, are one three-way pipe and one two-way pipe that are separated, the length of the valid section of the low-pass filter pipe is a sum of lengths of valid sections in the separated pipes, and the cross-sectional area of the valid section of the low-pass filter pipe is a total cross-sectional area of the valid sections in the separated pipes.

Assuming that the low-pass filter pipe includes m separated pipes, a valid section of each of the separated pipes is a pipe section between closest openings between two ends of the low-pass filter pipe in the pipe in an extension direction of the low-pass filter pipe in the pipe. It is assumed that a cross-sectional area of a valid section of the first pipe is P1, a length of the valid section of the first pipe is F1, a cross-sectional area of a valid section of the second pipe is P2, a length of the valid section of the second pipe is F2, ..., a cross-sectional area of a valid section of the $m^{th}$ pipe is Pm, and a length of the valid section of the $m^{th}$ pipe is Fm. The length of the valid section of the low-pass filter pipe is F1+F2+ ... +Fm, and the cross-sectional area of the valid section of the low-pass filter pipe is (P1×F1+P2×F2+ ... +Pm×Fm)/(F1+F2+ ... +Fm), where m is a positive integer greater than 1.

For each of the separated pipes, a cross-sectional area of a valid section is calculated in the following manner: If cross-sectional areas of all parts of the valid section are equal, a cross-sectional area of any part of the valid section is used as the cross-sectional area of the valid section. If cross-sectional areas of all parts of the valid section are unequal, the cross-sectional area of the valid section is an average cross-sectional area. It is assumed that the valid section includes n pipe sections with unequal cross-sectional areas, a cross-sectional area of the first section is S1, a length of the first section is L1, a cross-sectional area of the second section is S2, a length of the second section is L2, ..., a cross-sectional area of the $n^{th}$ section is Sn, and a length of the $n^{th}$ section is Ln. The average cross-sectional area of the valid section is (S1×L1+S2×L2+ ... +Sn×Ln)/(L1+L2+ ... +Ln), where n is a positive integer greater than 1. For each of the separated pipes, a length of a valid section is L1+L2+ ... +Ln.

In another implementation, if pipes in the branch pipe that are used as the low-pass filter pipe are separated, for the plurality of separated pipes, ratios of cross-sectional areas to lengths of valid sections of any one or more of the pipes may be less than or equal to 4 mm²/10 mm, or ratios of cross-sectional areas to lengths of valid sections of all of the pipes may be less than or equal to 4 mm²/10 mm.

Figure 12:
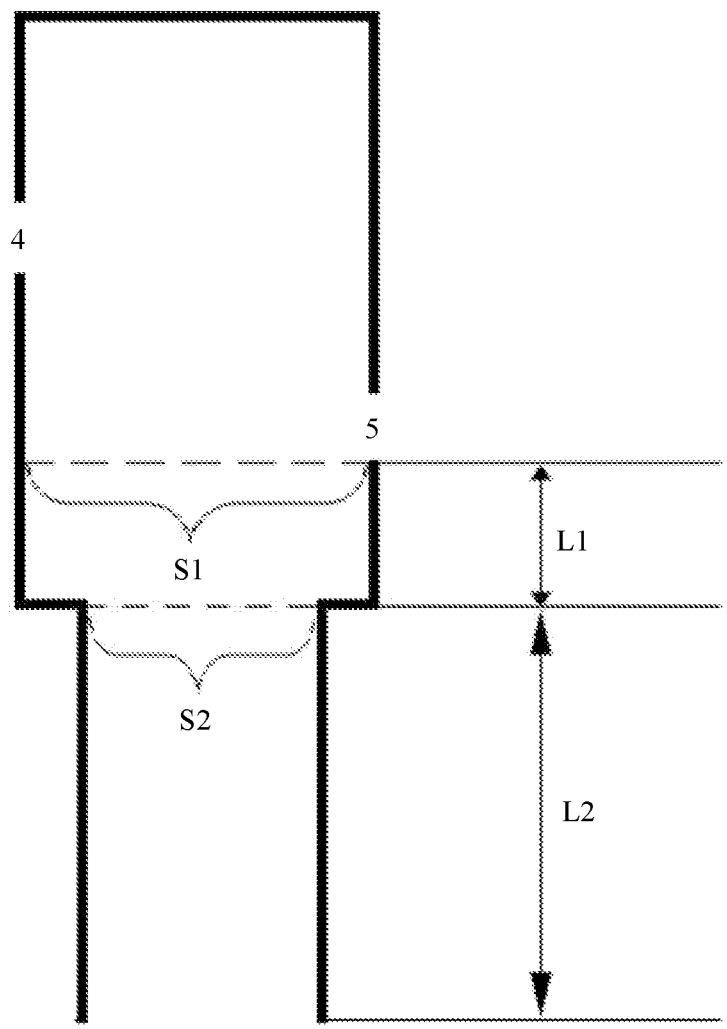
FIG. 12 is a form of a plurality of openings in an open end of a branch pipe disposed in an earmuff component according to this application.
Figure 13:
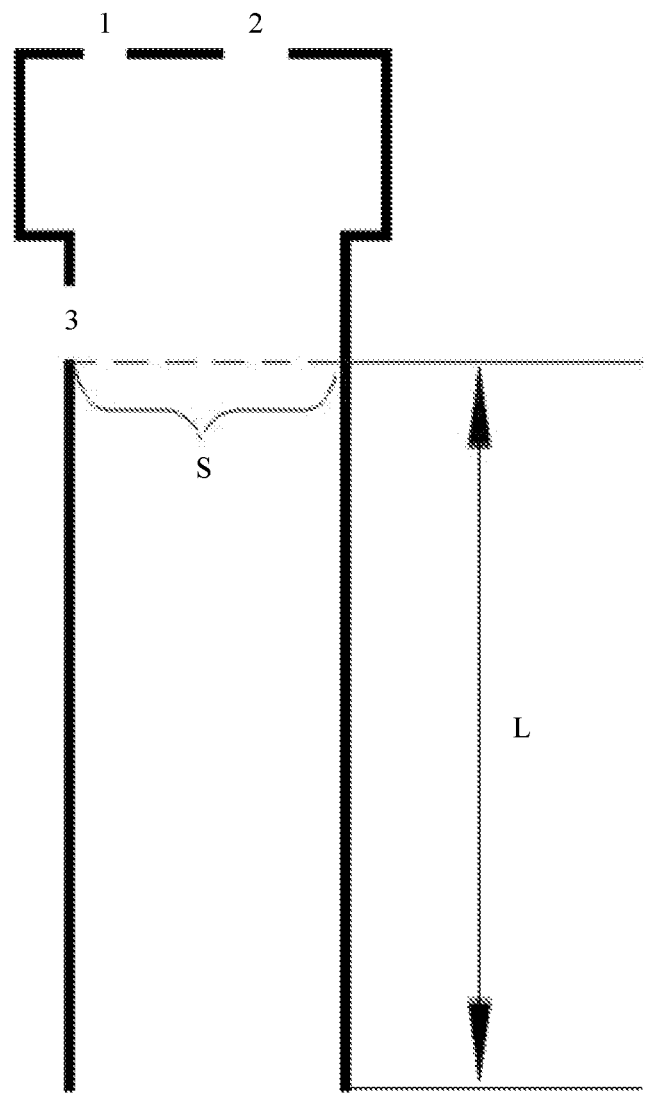
FIG. 13 is another form of a plurality of openings in an open end of a branch pipe disposed in an earmuff component according to this application.

For two-way pipes used as the low-pass filter pipes that are shown in FIG. 12 and FIG. 13, one open end shown in FIG. 12 has two openings: an opening 4 and an opening 5, the other open end has only one opening, and cross-sectional areas of all parts are unequal. One open end shown in FIG. 13 has three openings: an opening 1, an opening 2, and an opening 3, the other open end has only one opening, and cross-sectional areas of all parts are unequal. A length of a valid section of the low-pass filter pipe shown in FIG. 12 is L1+L2, and an average cross-sectional area of the valid section is (S1×L1+S2×L2)/(L1+L2), where S1 is a cross-sectional area of the low-pass filter pipe on a length of L1, and S2 is a cross-sectional area of the low-pass filter pipe on a length of L2. A length of a valid section of the low-pass filter pipe shown in FIG. 13 is L, and a cross-sectional area of the valid section of the low-pass filter pipe is a cross-sectional area S on the length L.

A cross-sectional area of the pipe in the foregoing embodiment of this application is a cross-sectional area of space surrounded by an inner wall of the pipe.

Cross-sectional shapes of all parts of the branch pipe in the foregoing embodiment of this application may be the same, or may be different. For example, the shape may be a circle, a rectangle, a hexagon, or an irregular shape.

A dustproof mesh or a damping mesh may cover an opening position of each open end of the pipe, or a sound absorption material may be filled in the pipe, to avoid a case in which excessive atmospheric pressure is leaked and low-band sound wave response sensitivity is affected. Certainly, when the low-band sound wave response sensitivity is not affected, no dustproof mesh or damping mesh may cover the opening position of the open end of the pipe, and no sound absorption material may be filled in the pipe.

Figure 29:
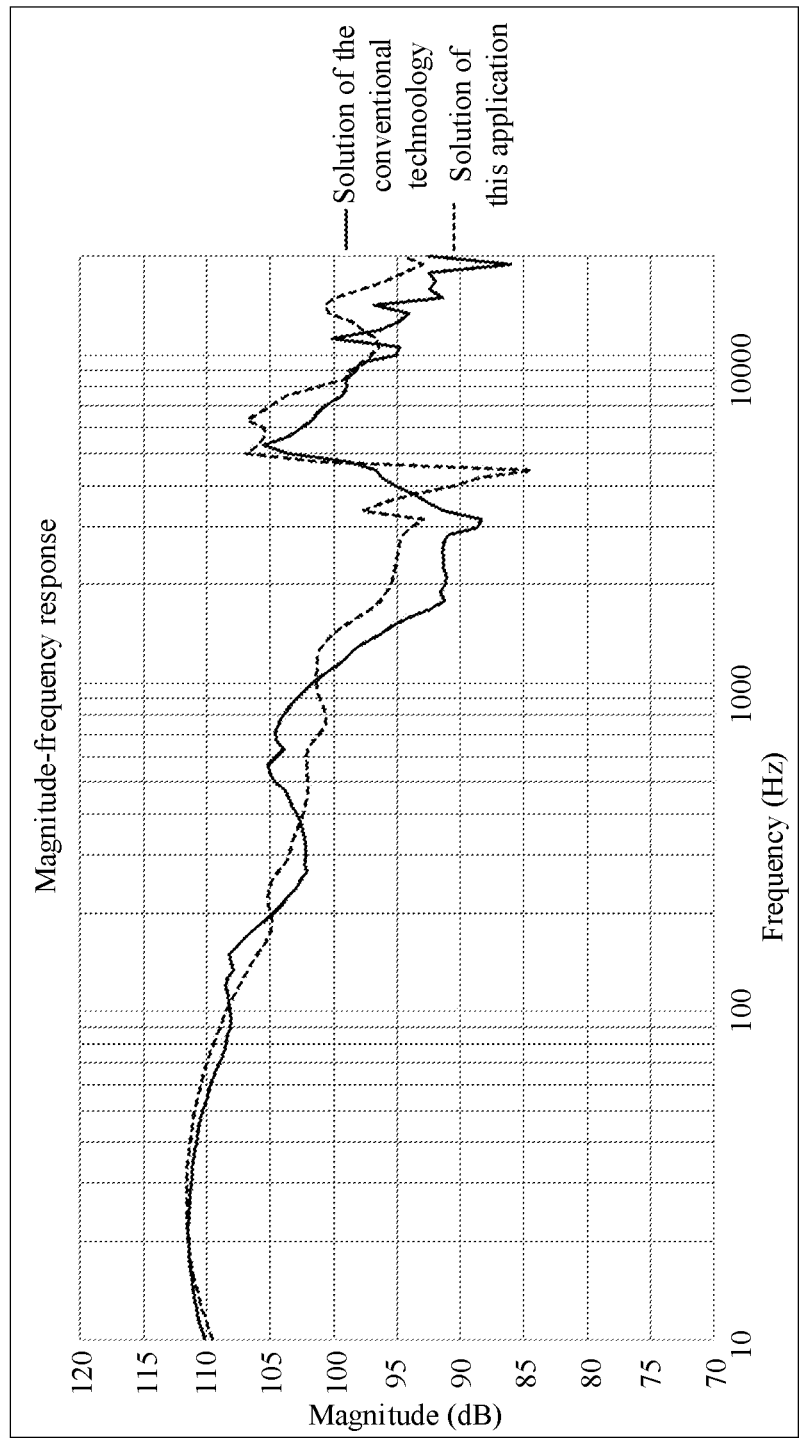
FIG. 29 is a diagram of comparison between sound pressure level magnitude-frequency response curves of an earmuff component in this application and an existing earmuff component.

For the headset, it is generally expected that middle-band and low-band sound pressure level sensitivity of the driver and the sound cavity is as high as possible, and it is expected that phase-frequency responses of the driver and the sound cavity for middle-band and low-band sound waves are stabilized within a relatively small range. Refer to FIG. 29. A vertical coordinate in FIG. 29 is a sound pressure level magnitude-frequency response, and a horizontal coordinate axis is a frequency of a sound wave. Curves shown in the figure are sound pressure level magnitude-frequency response curves. It is generally expected that values of sound pressure level magnitude-frequency responses of the driver and the sound cavity of the headset for middle-band and low-band sound waves are as large as possible to achieve higher sensitivity. For example, middle-band and low-band sound wave response sensitivity is relatively high in both a dashed curve and a solid curve in the figure, but in the dashed curve, responses are more stable on a middle band and a low band, and the dashed curve is more flat.

Figure 30:
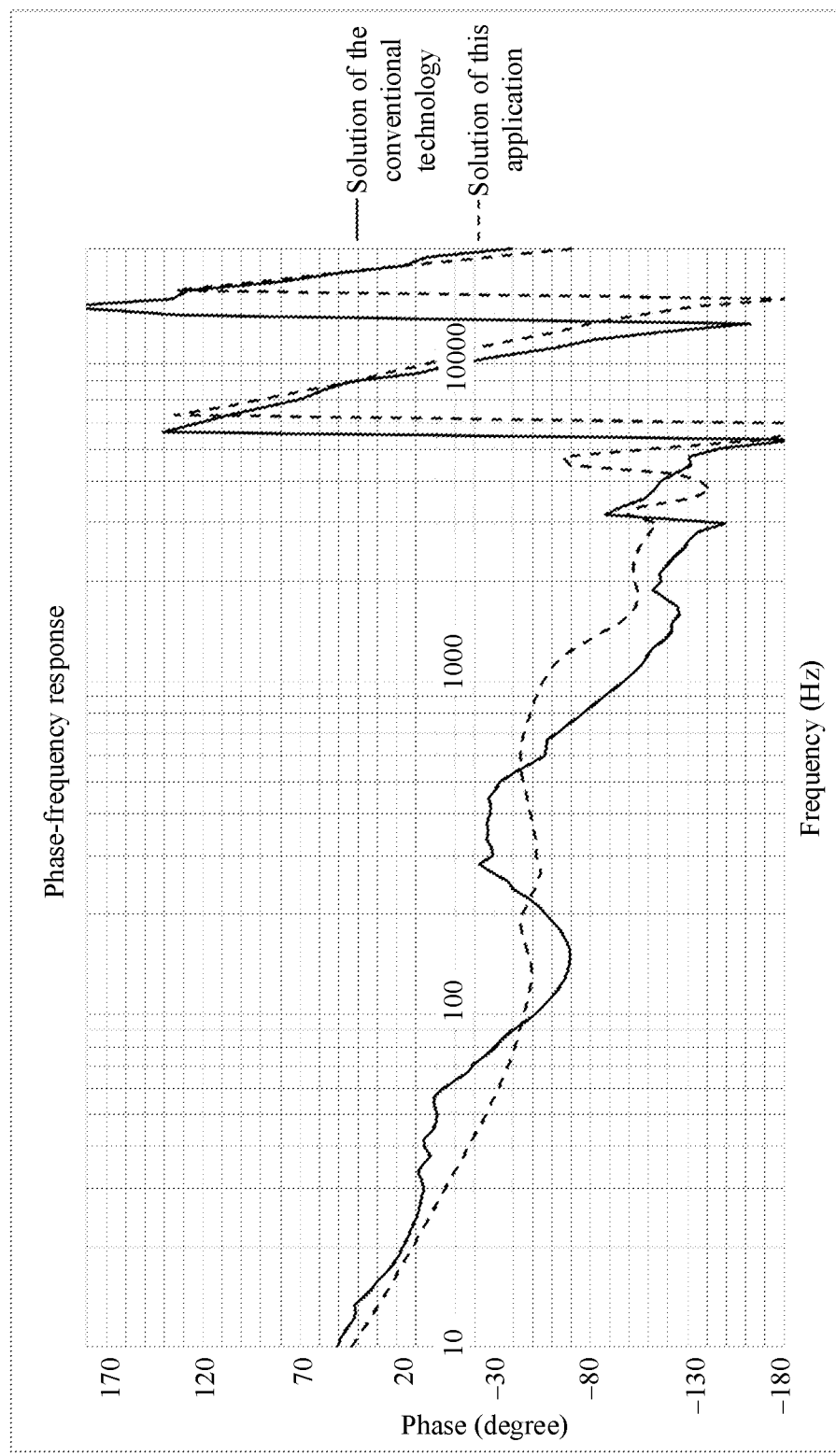
FIG. 30 is a diagram of comparison between sound pressure level phase-frequency response curves of an earmuff component in this application and an existing earmuff component.

As shown in FIG. 30, a horizontal coordinate axis is a frequency of a sound wave, a vertical coordinate axis is a phase ranging from −180 degrees to +180 degrees, and curves shown in the figure are phase-frequency response curves. It can be learned that a dashed curve is more flat and less fluctuates than a solid curve for a part less than 1000 Hz.

Refer to FIG. 5, FIG. 6, FIG. 8, FIG. 10, FIG. 14, FIG. 16, FIG. 18, FIG. 20, FIG. 22, FIG. 24, FIG. 26, and FIG. 28. A microporous channel 20 may be further disposed inside the earmuff component 2 in this application, and there may be one or more microporous channels.

When the additional rear cavity 26 is not disposed, the microporous channel 20 is disposed in the rear cavity housing 241, and connects the rear cavity 24 and the external environment.

When the hardware compartment 28 is disposed, the hardware compartment 28 surrounds the outside of the rear cavity 24, and the hardware compartment 28 is connected to the external environment. The microporous channel disposed in the rear cavity housing 241 connects the rear cavity 24 and the hardware compartment 28, so that the rear cavity 24 is connected to the external environment.

When the additional rear cavity 26 is disposed, the microporous channel 20 is disposed in the rear cavity housing 241, and connects the rear cavity 24 and the additional rear cavity 26.

The microporous channel is disposed to provide acoustic damping. A low-band sound wave in sound waves emitted by the driver resonates with the rear cavity and a part of the branch pipe. The microporous channel can suppress the resonance to some extent by providing acoustic damping. In this way, a low-band sound wave response is not prone to fluctuation. In this way, more flat sound pressure level magnitude and phase responses on a low band can be implemented by using the microporous channel.

Figure 28:
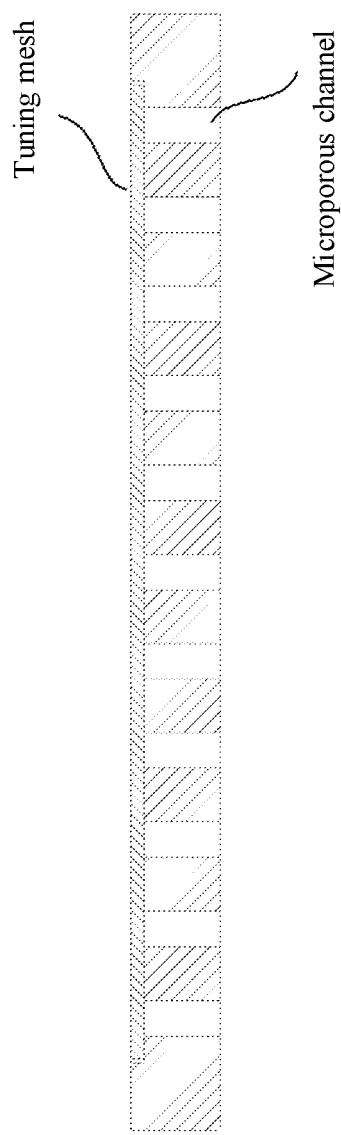
FIG. 28 is a schematic diagram of a microporous channel disposed in an earmuff component according to this application.

For a specific design form of the microporous channel, refer to FIG. 28. A length of the microporous channel may be not less than 0.5 mm, and a cross-sectional area of a single microporous channel may range from 0.2 mm² to 5 mm².

When there are a plurality of microporous channels, the plurality of microporous channels may be arranged together, or may be scattered. Cross-sectional areas of all of the plurality of microporous channels may be unequal, or cross-sectional areas of some of the microporous channels may be equal.

When there are a plurality of microporous channels, cross-sectional shapes of all of the plurality of microporous channels may be different, or cross-sectional shapes of some of the microporous channels may be the same.

When there are a plurality of microporous channels, a total cross-sectional area of the plurality of microporous channels may range from 1 mm² to 20 mm².

An acoustic resistance of a single through-hole in the microporous channel may be calculated in the following manner:

$$Ra = \frac{l}{\pi a^3}\sqrt{2\eta_e \omega \rho_0} \text{ and } \eta_e = \eta\left[1+(\gamma-1)\sqrt{\frac{\kappa}{\gamma c_p \eta}}\right],$$

where l is a through-pole length, a is a through-pole radius, $\omega$ is an angular frequency of a sound wave, $\eta$ is a shear viscosity coefficient of a medium, $\gamma$ is a specific heat ratio of the medium, $\kappa$ is a heat conductivity, and $c_p$ is a specific heat capacity at constant pressure.

It can be learned that if the through-hole length l increases, the acoustic resistance increases, and if the through-hole length l decreases, the acoustic resistance decreases; and if the through-hole radius a increases, the generated acoustic resistance decreases, and if the through-hole radius a decreases, the generated acoustic resistance increases.

The microporous channel is disposed to generate the acoustic resistance, so that impedance of an acoustic system (including the driver, the sound cavity, and the like) of the headset for middle-band and low-band sound waves is increased, and a relatively low acoustic quality factor can be achieved, and a magnitude-frequency response curve and a phase-frequency response curve of the middle-band and low-band sound waves are more flat.

In addition, if the acoustic resistance generated by the microporous channel is excessively large, sensitivity of sound pressure level magnitude-frequency responses of the acoustic system (including the driver, the sound cavity, and the like) of the headset for middle-band and low-band sound waves is reduced.

A more elongated microporous channel generates larger viscosity damping of surface. However, if a plurality of microporous channels are parallel, generated viscosity damping of surface decreases instead of increasing. Therefore, a radius of the microporous channel and a quantity of microporous channels need to be comprehensively determined.

If a tuning mesh is disposed in the headset to increase an acoustic resistance, damping increased by the tuning mesh needs to be taken into account, and flatness of a middle-band and low-band sound wave response curve and middle-band and low-band sound wave response sensitivity need to be balanced.

Refer to FIG. 28. A dustproof mesh or a tuning mesh may further cover a port and an inner wall of the microporous channel, to avoid a case in which excessive atmospheric pressure is leaked and low-band sound wave response sensitivity is affected.

In the noise reduction headset provided in this application, the branch pipe and the microporous channel may be integrated together. The branch pipe and the microporous channel are integrated together in the following manner: An independent microporous channel is omitted, and a damping material is attached to an inner wall of a part that is of the branch pipe and that connects the rear cavity and the external environment, or a damping material is attached to an inner wall of a part that is of the branch pipe and that connects the rear cavity and the additional rear cavity.

The sound cavity, the branch pipe, and the microporous channel inside the earmuff component are disposed to improve a noise reduction effect of the headset and improve acoustic performance of the headset. For the headphone and the in-ear earphone, for the front cavity, the rear cavity, and the additional rear cavity of the earmuff component or the earbud component, in addition to the open window, the branch pipe, and the microporous channel, no other pipe needs to be disposed to connect any two of the cavities, and no other pipe needs to be disposed to connect any one of the cavities and the external environment. For the half-in-ear earphone, in addition to the main open window, the auxiliary open window, the branch pipe, and the microporous channel, no other pipe needs to be disposed to connect any two of the cavities, and no other pipe needs to be disposed to connect any one of the cavities and the external environment.

FIG. 29 and FIG. 30 are diagrams of comparison of sound pressure level frequency responses of an earmuff component in this application and an existing earmuff component (under a test standard of IEC 60318). It can be learned that, in a range (within 1 KHz) of a middle band and a low band, the earmuff component in this application can obtain same low-band sensitivity as that in the solution of the conventional technology, but has a more flat magnitude-frequency response curve and a more flat phase-frequency response curve, to help an active noise reduction algorithm in the headset produce a better noise reduction effect.

Figure 31:
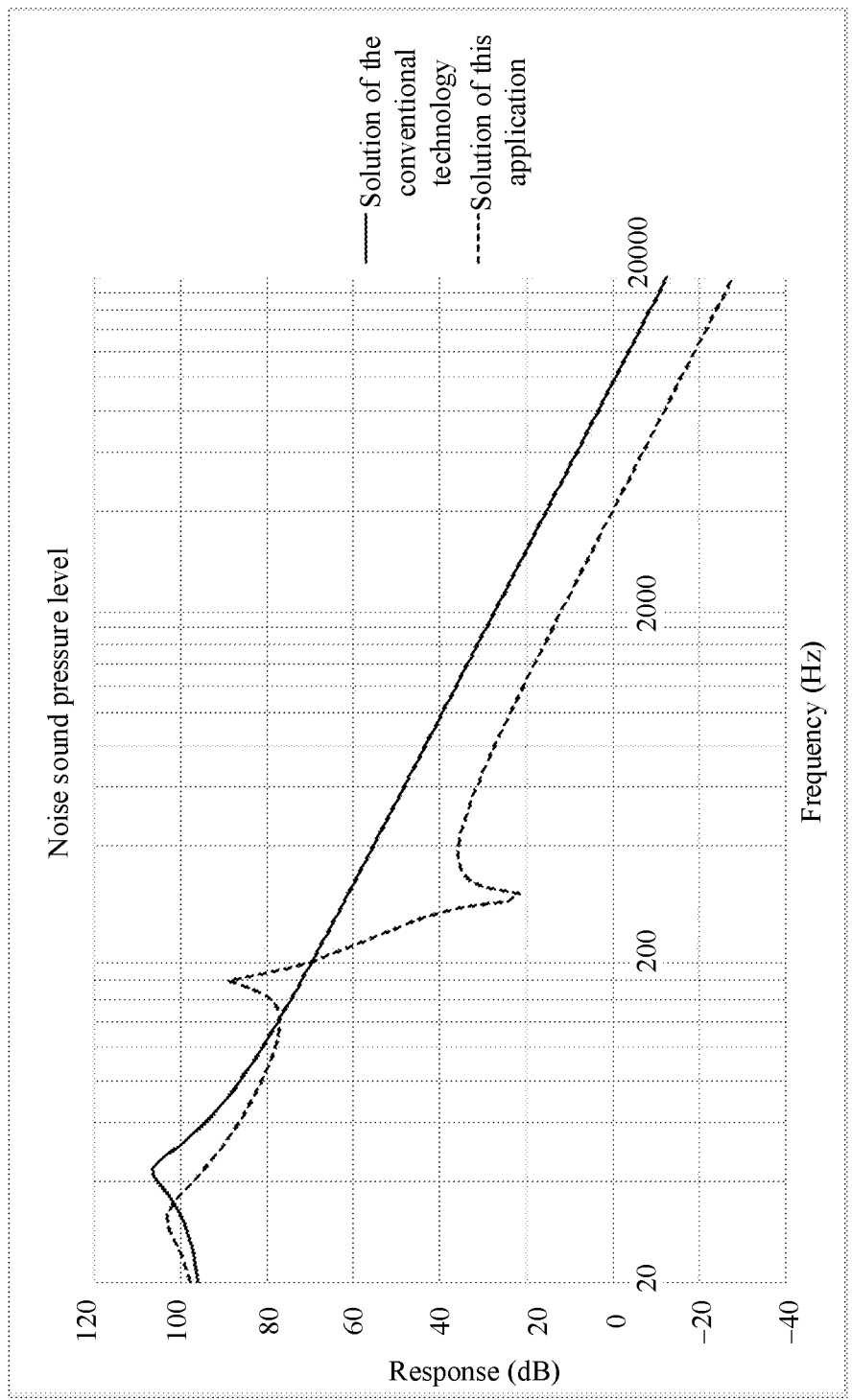
FIG. 31 is a diagram of comparison between noise sound pressure level curves of an earmuff component in this application and an existing earmuff component.

FIG. 31 shows comparison of computer simulation and test results of an earmuff component in this application and an existing earmuff component in terms of passive noise reduction performance. It can be learned that, in terms of passive noise reduction performance, the earmuff component in this application can better reduce a sound pressure level of middle-band and high-band noise, and therefore takes an obvious advantage over the existing earmuff component.

In the descriptions of this application, it should be understood that relative location relationships indicated by terms "center", "up", "down", "front", "rear", "left", "right", "vertical", "horizontal", "top", "bottom", "inside", "outside", and the like are relative location relationships between components when the components are placed at angles shown in the accompanying drawings. The components may be alternatively placed at other angles.

The terms "first", "second", "A", "B", "C", and "D" are used only to distinguish between similar components or structures, and do not indicate relative importance or quantities of parts or structures. In the descriptions of this application, unless otherwise specified, "a plurality of" means two or more than two.

In the descriptions of this application, it should be noted that the terms "installation", "connection", and "joint" should be understood in a broad sense unless otherwise expressly specified and limited, for example, may be fastening, a detachable connection, or integration, may be a direct connection, or may be an indirect connection using an intermediate medium.

What is claimed is:

1. A headset receiver:
a housing;
a driver located inside the housing, wherein the driver is configured to: receive an audio signal and to convert the audio signal into a sound wave,
a sound cavity is disposed inside the housing,
wherein:
the sound cavity comprises a front cavity and a rear cavity that are disposed adjacent to each other,
the driver is disposed at a junction between the front cavity and the rear cavity, and the headset receiver further comprises a single multi-port branch pipe having three ports that acoustically connect the front cavity, the rear cavity, and an external environment.

2. The headset receiver according to claim 1, wherein the branch pipe is in a structural form of a three-way pipe, the three-way pipe comprises a hub pipe, a first pipe, a second pipe, and a third pipe, the first pipe, the second pipe, and the third pipe are all connected to the hub pipe, and the hub pipe is located in the rear cavity.

3. The headset receiver according to claim 2, wherein the three-way pipe comprises a hub pipe, a first pipe, and a second pipe, both the first pipe and the second pipe are connected to the hub pipe, the hub pipe is located in the rear cavity, and one or more openings are disposed in the hub pipe.

4. The headset receiver according to claim 1, wherein the branch pipe comprises a two-way pipe connecting the front cavity and the rear cavity and a two-way pipe connecting the rear cavity and the external environment.

5. The headset receiver according to claim 1, wherein the sound cavity further comprises an additional rear cavity, the branch pipe is further connected to the additional rear cavity, the additional rear cavity surrounds the outside of the rear cavity, one side of the rear cavity is adjacent to the front cavity, and the other side is adjacent to the additional rear cavity.

6. The headset receiver according to claim 5, wherein the branch pipe is in a structural form of a four-way pipe, the four-way pipe comprises a pipe A, a pipe B, a pipe C, a pipe D, and a hub pipe, the pipe A, the pipe B, the pipe C, and the pipe D are all connected to the hub pipe, and the hub pipe is located in the additional rear cavity, or the hub pipe crosses the rear cavity and the additional rear cavity.

7. The headset receiver according to claim 5, wherein the branch pipe comprises a three-way pipe connecting the front cavity, the rear cavity, and the additional rear cavity and a two-way pipe connecting the additional rear cavity and the external environment, the three-way pipe comprises a hub pipe, a first pipe, a second pipe, and a third pipe, the first pipe, the second pipe, and the third pipe are all connected to the hub pipe, and the hub pipe is located in the rear cavity or the additional rear cavity, or the hub pipe crosses the rear cavity and the additional rear cavity.

8. The headset receiver according to claim 5, wherein the branch pipe comprises a three-way pipe connecting the front cavity, the additional rear cavity, and the external environment and a two-way pipe connecting the rear cavity and the additional rear cavity, the three-way pipe comprises a hub pipe, a first pipe, a second pipe, and a third pipe, the first pipe, the second pipe, and the third pipe are all connected to the hub pipe, and the hub pipe is located in the additional rear cavity.

9. The headset receiver according to claim 5, wherein the branch pipe comprises a three-way pipe connecting the rear cavity, the additional rear cavity, and the external environment and a two-way pipe connecting the front cavity and the rear cavity, the three-way pipe comprises a hub pipe, a first pipe, a second pipe, and a third pipe, the first pipe, the second pipe, and the third pipe are all connected to the hub pipe, and the hub pipe is located in the additional rear cavity.

10. The headset receiver according to claim 5, wherein the branch pipe comprises a three-way pipe connecting the rear cavity, the additional rear cavity, and the external environment and a two-way pipe connecting the front cavity and the additional rear cavity, the three-way pipe comprises a hub pipe, a first pipe, a second pipe, and a third pipe, the first pipe, the second pipe, and the third pipe are all connected to the hub pipe, and the hub pipe is located in the additional rear cavity.

11. The headset receiver according to claim 5, wherein the branch pipe comprises a two-way pipe connecting the front cavity and the rear cavity, a two-way pipe connecting the rear cavity and the additional rear cavity, and a two-way pipe connecting the additional rear cavity and the external environment.

12. The headset receiver according to claim 5, wherein the branch pipe comprises a two-way pipe connecting the front cavity and the additional rear cavity, a two-way pipe connecting the rear cavity and the additional rear cavity, and a two-way pipe connecting the additional rear cavity and the external environment.

13. The headset receiver according to claim 12, wherein a ratio of a cross-sectional area to a length of a valid section of the low-pass filter pipe is less than or equal to 4 mm$^2$/10 mm, and the valid section is a pipe section that is in the low-pass filter pipe and that substantially affects filter performance.

14. The headset receiver according to claim 1, wherein a part that is of the branch pipe and that is located between the front cavity and the external environment is a low-pass filter pipe, and the low-pass filter pipe is an elongated pipe.

15. The headset receiver according to claim 1, wherein a microporous channel is disposed in a rear cavity housing, there are one or more microporous channels, and the rear cavity housing is configured to surround the rear cavity.

16. The headset receiver according to claim 1, the single multi-port branch pipe having four ports that acoustically connect the front cavity, the rear cavity, and the external environment.

17. A headset, wherein the headset comprises a headband and headset receivers connected to two ends of the headband,
wherein each headset receiver comprises a housing and a driver located inside the housing, the driver is configured to: receive an audio signal, and convert the audio signal into a sound wave, a sound cavity is disposed inside the housing, the sound cavity comprises a front cavity and a rear cavity that are disposed adjacent to each other, the driver is disposed at a junction between the front cavity and the rear cavity, the headset receiver further comprises a single multi-port branch pipe having three ports that acoustically connect the front cavity, the rear cavity, and an external environment.

18. The headset according to claim 17, wherein the branch pipe is in a structural form of a three-way pipe, the three-way pipe comprises a hub pipe, a first pipe, a second pipe, and a third pipe, the first pipe, the second pipe, and the third pipe are all connected to the hub pipe, and the hub pipe is located in the rear cavity.

19. The headset according to claim 18, wherein the three-way pipe comprises a hub pipe, a first pipe, and a second pipe, both the first pipe and the second pipe are connected to the hub pipe, the hub pipe is located in the rear cavity, and one or more openings are disposed in the hub pipe.

20. The headset according to claim 17, wherein the branch pipe comprises a two-way pipe connecting the front cavity and the rear cavity and a two-way pipe connecting the rear cavity and the external environment.

21. A headset, wherein the headset comprises a headset cable and a headset receiver,
   wherein the headset receiver comprises a housing and a driver located inside the housing, the driver is configured to: receive an audio signal, and convert the audio signal into a sound wave, a sound cavity is disposed inside the housing, the sound cavity comprises a front cavity and a rear cavity that are disposed adjacent to each other, the driver is disposed at a junction between the front cavity and the rear cavity, the headset receiver further comprises a single multi-port branch pipe having three ports that acoustically connect the front cavity, the rear cavity, and an external environment; and
   the headset cable is connected to a driver inside the headset receiver.

22. The headset according to claim 21, the single multi-port branch pipe having four ports that acoustically connect the front cavity, the rear cavity, and the external environment.

\* \* \* \* \*